United States Patent [19]

Yagasaki

[11] Patent Number: 5,303,381
[45] Date of Patent: Apr. 12, 1994

[54] METHOD AND APPARATUS FOR SORTING SEQUENTIAL INPUT SIGNALS BY CONCURRENTLY COMPARING SUCCESSIVE INPUT SIGNALS AMONG SIGNALS IN FIRST AND SECOND MEMORY SECTIONS

[75] Inventor: Toshiaki Yagasaki, Irvine, Calif.

[73] Assignee: Canon Kabushiki Kaisha, Tokyo, Japan

[21] Appl. No.: 554,384

[22] Filed: Jul. 19, 1990

[51] Int. Cl.⁵ .............................................. G06F 7/06
[52] U.S. Cl. ................................. 395/800; 364/259.2; 364/947.2; 364/948.3; 364/DIG. 2; 340/146.2
[58] Field of Search ............... 395/800, 600; 364/194; 340/146.2

[56] References Cited

U.S. PATENT DOCUMENTS

| | | | |
|---|---|---|---|
| 4,031,520 | 6/1977 | Rohner | 395/800 |
| 4,101,968 | 7/1978 | Florence | 395/800 |
| 4,520,456 | 5/1985 | Miranker et al. | 395/800 |
| 4,541,048 | 9/1985 | Propster et al. | 395/725 |
| 4,595,995 | 6/1986 | Alles | 395/800 |
| 4,628,483 | 12/1986 | Nelson | 395/800 |
| 4,991,134 | 2/1991 | Ivsin | 395/800 |
| 5,222,243 | 6/1993 | Briggs et al. | 395/800 |

OTHER PUBLICATIONS

"Data Structures" by Edward M. Reingold, Wilfred J. Hansen; 1983, Little, Brown and Company, pp. 378-381.

Primary Examiner—Thomas C. Lee
Assistant Examiner—Paul Harrity
Attorney, Agent, or Firm—Fitzpatrick, Cella, Harper & Scinto

[57] ABSTRACT

A sorting arrangement such as in a pattern recognizer employs a memory having N data storage locations. The same extreme value data signal is initially placed in each location. The memory locations are partitioned into two or more sections. A sequence of input signals having values other than the extreme value are received. The value of the current input signal is compared to the values of the data signals in the first section to determine a position for the input signal among the memory locations while, concurrently, the immediately preceding input signal is compared to the values of the data signals of the second section to determine a position for the immediately preceding input signal in the memory locations. The sorting is speeded up by the input signal overlap.

55 Claims, 10 Drawing Sheets

METHOD AND APPARATUS FOR SORTING SEQUENTIAL INPUT SIGNALS BY CONCURRENTLY COMPARING SUCCESSIVE INPUT SIGNALS AMONG SIGNALS IN FIRST AND SECOND MEMORY SECTIONS

FIELD OF THE INVENTION

The invention relates to data sorting and more particularly to the sorting of numerical data.

DESCRIPTION OF THE RELATED ART

In pattern recognition systems, an unknown pattern such as an image or a sound is analyzed to derive a set of representative features. The feature set for the unknown pattern is compared to previously stored feature sets obtained from known patterns. The unknown pattern may then be identified as the known pattern having the stored feature set that most closely matches the unknown feature set. An optical character recognizer, for example, may store a plurality of signals each corresponding to a vector representing the features of a different character. The vector signals are multidimensional. Each dimension may, for example, correspond to a standard feature such as the position or angle of a character stroke. By comparing a vector signal derived from an unknown image to the stored vector signals for the possible characters (e.g., A, B, C, . . .), the unknown image may be identified as a particular character. As is well known, the variation in size and appearance and the complexity of the unknown images generally result in several likely candidates. Further analysis can then be employed to determine the best candidate. A typical character recognition system employs a dictionary to store a set of feature vectors representing the image patterns of possible characters. An image sensor converts an unknown image to be recognized as one of the possible characters into a set of signals representing the unknown image pattern. The image pattern is analyzed to form a feature vector representing the characteristics of the unknown image. A pattern classifier compares the feature vector for the unknown image with the feature vector for each character in the dictionary. As a result of the comparison, a signal is generated that corresponds to a numeric distance indicative of the relative similarity of the unknown image to the dictionary character. In a multiple candidate arrangement, the distance signals for the dictionary characters are sorted in order of closeness to the unknown image to choose a set of candidates. Each candidate in the sorted array includes a character identification code and a numeric distance signal indicative of the similarity of the candidate to the unknown image. The distance signals of the sorted array are then analyzed further to select the best candidate.

The use of multiple candidates and the sorting of candidates according to their distance signals contribute significantly to character recognition accuracy. Sorting arrangements, however, require that each newly generated distance signal from the feature vector classifier be compared to every previously generated candidate distance signal to determine the place of the newly classified character candidate in the candidate array. In known sorters, the sorting of each classified character candidate is delayed until the sorting operations for the preceding classified character candidate has been completed. As a result, the candidate sort is relatively slow and the time required to recognize a character is extended. The delay in recognition is particularly noticeable where there are a large number of possible characters. In systems adapted to recognize Kanji characters, for example, there may be as many as 4000 stored feature vectors in the dictionary and the candidate array may include 100 sorted candidates. For such a character set, 4000 candidates must be sorted for each unknown image to provide an ordered array of 100 candidates.

SUMMARY OF THE INVENTION

It is a principal object of the invention to provide an improved sorting method and apparatus that reduces the time required for sorting a plurality of signals.

The invention is directed to an arrangement for sorting a set of signals having values within a prescribed range in which a set of data signals is arranged in positions according to a prescribed order. Each data signal is initially set to a predetermined extreme value outside the prescribed range. The value of one input signal of the sequence is successively compared to the values of data signals in one portion of the data signal set to place the input signal in a position in the prescribed order of the data set according to its value among the data signals of the one portion of the data set while another input signal of the sequence is successively compared to the values of the data signals in another portion of the data signal set to place the another input signal in a position in the prescribed order of the data set according to its value among the data signals of the another portion of the data set.

According to one aspect of the invention, a data set is partitioned into at least two sets of data signals each having a predetermined extreme value are formed. A sequence of input signals is received in successive time periods. Each input signal has a value other than the predetermined extreme value. The input signals of the sequence are sorted by comparing the value of the input signal received in each time period with the values of the data signals of the first data set to place the input signal received in the time period in a data position according to its value among the data signals of the first data set. In each time period, the value of the input signal received in the immediately preceding time period is compared with the values of the data signals in the second data set to place the input signal received in the immediately preceding time period in a data position according to its value among the data signals of the second data set. Advantageously, the sorting of the input signals is overlapped to speed up the sorting of the input signal set.

According to another aspect of the invention, the predetermined extreme value is greater than the largest input signal value and the data signal Dn in each data set has a value greater than or equal to the next successive data signal $D_{n-1}$ in the data set. The value of the input signal is compared to the values of the data signals in each data set by successively comparing the value of the input signal to the values of each successive pair of data signals $D_n$ and $D_{n-1}$ in the data set. The compared data signal $D_n$ is replaced by the input signal when the value of the compared next successive data signal $D_{n-1}$ is less than or equal to the value of the input signal and the data signal $D_n$ is replaced by the next successive data signal $D_{n-1}$ if the value of the input signal is less than or equal to the value of the next successive data signal $D_{n-1}$.

According to yet another aspect of the invention, the predetermined extreme value is less than the smallest input signal value and the data signal Dn in each data set has a value less than or equal to the next successive data signal Dn−1 in the data set. The value of the input signal is compared to the values of the data signals in each data set by successively comparing the value of the input signal to the values of each successive pair of data signals Dn and Dn−1 in the data set. The compared data signal Dn is replaced by the input signal when the value of the compared next successive data signal Dn−1 is greater than the value of the input signal. The data signal Dn is replaced by the next successive data signal Dn−1 in the event that the value of the input signal is greater than the value of the next successive data signal Dn−1.

According to yet another aspect of the invention, the data signals are stored in a memory having a set of N storage locations that is partitioned into at least first and second sections. A data signal having a predetermined extreme value is stored in each memory location. The input signals of the sequence are sorted by comparing the value of the input signal received in each time period with the values of the data signals in the storage locations of the first memory section to place the input signal received in the time period in a storage location according to its value among the data signals of the first data set. In each time period, the value of the input signal received in the immediately preceding time period is compared with the values of the data signals in the storage locations of the second memory section to place the input signal received in the immediately preceding time period in a storage location according to its value among the data signals of the second data set.

In an embodiment illustrative of the invention, a dictionary stores a plurality of reference signals each corresponding to a different prescribed pattern. A signal representing an unknown pattern is formed and a sequence of signals each representing the similarity of the unknown pattern to one of the prescribed reference patterns is produced. Each similarity signal has a value other than the predetermined extreme value. A sort memory comprising N data storage locations n=1, 2, . . ., N, partitioned into at least first and second sections is initially set to store a data signal having a predetermined extreme value in each storage location. The sequence of similarity signals are received in successive time periods and are sorted among the data storage locations of the memory in a prescribed order. In each time period, the value of the similarity signal received in the time period is compared with the values of the data signals in the storage locations of the first memory section to place the similarity signal received in the time period in a memory storage location according to its value among the data signals of the first memory section storage locations. Concurrently, the value of the similarity signal received in the immediately preceding time period is compared with the values of the data signals in the storage locations of the second memory section to place the similarity signal received in the immediately preceding time period in a memory storage location according to its value among the data signals of the second memory section storage locations.

DETAILED DESCRIPTION OF THE PREFERRED EMBODIMENTS

An embodiment of the present invention will now be described in detail with reference to the drawings.

Figure 1:
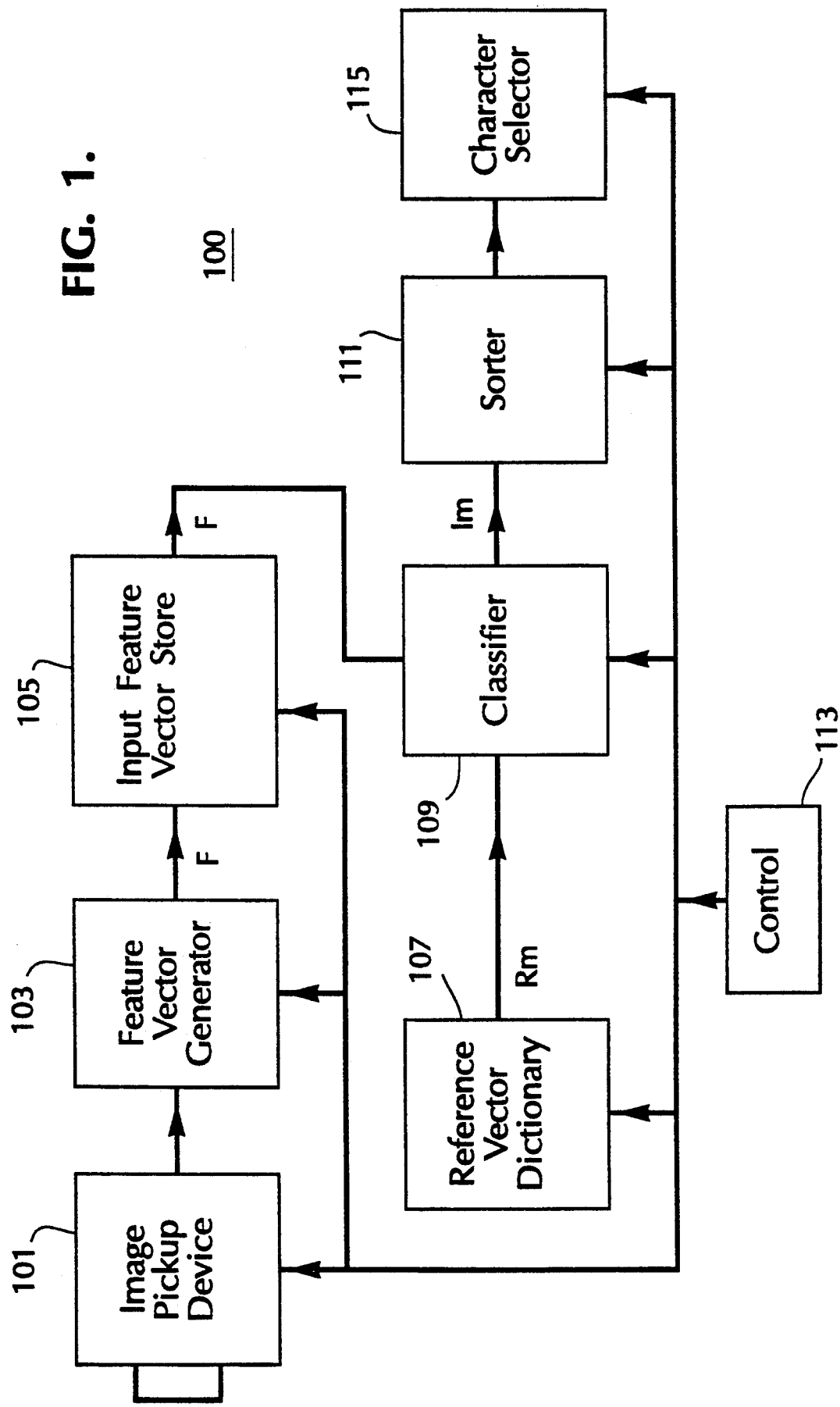
FIG. 1 depicts a general block diagram of a character recognition circuit employing a candidate sorter.

FIG. 1 shows a general block diagram of a character recognition circuit 100 in which an embodiment of the present invention may be utilized. The character recognition circuit 100 includes an image pickup device 101 for converting an image to be recognized into a signal pattern, a feature vector signal generator 103 that forms a feature vector signal F representative of the image signal pattern, an input feature vector store 105 adapted to store the formed feature vector signals, a reference vector dictionary 107 that stores identified reference feature vector signals for the possible recognition characters, a classifier 109 adapted to form a distance signal Im for each reference character Rm representing the similarity of reference character feature vector to the input image feature vector, a sorter 111 for sorting a predetermined number of the identified character distance signals, a character selector 115, and a control 113 adapted to control the operations of the character recognition circuit 100.

Figure 2:
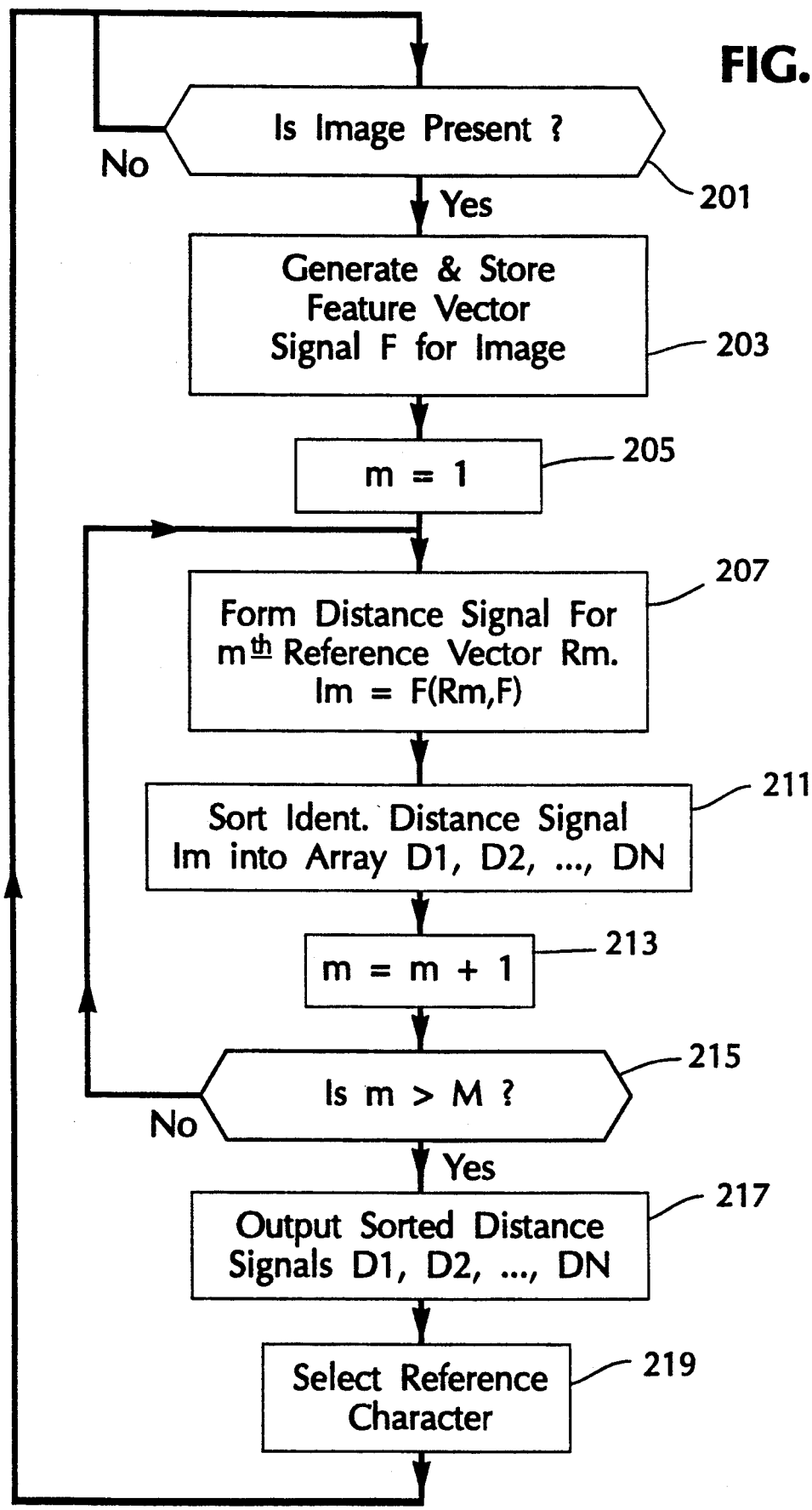
FIG. 2 a flow chart illustrating the operation of the circuit of FIG. 1.

FIG. 2 shows a flow chart illustrating the operation of the character recognition circuit 100 of FIG. 1. The flow chart corresponds to a set of instruction codes permanently stored in the control 113 or to a state sequence arrangement in the control 113. The flow chart includes an image present decision step 201, a step 203 for generating and storing a feature vector for an unknown image, a character index setting step 205, a distance signal forming step 207, a sort step 211, a character index incrementing step 213, a last character decision step 215, a sorted distance outputting step 217, and a reference character selection step 219.

The operation of the character recognizer 100 is described with reference to FIGS. 1 and 2. The image pickup device 101 of FIG. 1 is set by the control 113 to detect the next image to be recognized as per the decision step 201 of FIG. 2. When an image is received by the image pickup device 101, the signals corresponding thereto are applied to an input of the feature vector generator 103. The generator 103 generates a multidimensional vector F representative of prescribed features of the image in the step 203. The feature vector F is usually an N dimensional vector of the form $$F = f1, f2, \ldots, fn, \ldots, fN$$

Each component fn represents a different prescribed characteristic of the image (e.g., a stroke position). The feature vector signal F is stored in the input feature vector store 105.

The reference vector dictionary 107 stores feature vectors Rm previously generated for identified characters. The dictionary 107 may contain feature vector signals for the M possible characters (e.g., M=4000) used in the character recognition. Each reference feature vector Rm is an N dimensional vector of the form $$Rm = r1, r2, \ldots, rn, \ldots, rN$$

and each component rn represents a different characteristic of the reference character. The characteristic rn corresponds to the characteristic fn of the input feature vector so that a direct numerical comparison may be made.

The step 205 is entered from the step 203. In the step 205, the reference character index m that addresses the reference vector dictionary store 107 is set to one. As per step 207, the feature signal F and the reference feature signal Rm are applied to the classifier 109. A distance signal Im is formed in the classifier 109 which classifies the similarity between the input image and the reference character Rm in numerical terms. As is well known in the art, there are many metrics adapted to generate numerical similarity signals. The distance signal Im may be formed in accordance with the well known Mahalanobis distance function $$\sum_{n=1}^{N} (fn * rn),$$

the mean absolute distance metric $$\sum_{n=1}^{N} |fn - rn|$$

or the mean squared distance metric $$\sum_{n=1}^{N} (fn - rn)^2$$

If the Mahalanobis metric is used, the most similar character corresponds to the largest distance signal. If either the mean absolute distance or the mean squared distance metric is used, the most similar character corresponds to the smallest distance signal. The classifier 109 may comprise one of the many vector type calculators well known in the art and may be adapted to switch between several different distance metric calculations.

The distance signal Im formed in the classifier 109 is transferred to the sorter 111 wherein it is placed in a position according to a prescribed order among the candidates (the step 211). The reference character index m is then incremented by one in the step 213. Until the reference index is greater than the index M for the last reference character in the dictionary 107, the loop from the step 207 to the step 215 is iterated to form the sorted array of candidates D1, D2, ..., DN. The sorted distance signals D1, D2, ..., DN are supplied to the character selector 115 as per the step 217 and one of the candidate characters is selected in the step 219. The character selector 115 may comprise a circuit arrangement well known in the art adapted to further analyze the sorted candidates D1, D2, ..., DN on the basis of a different distance metric or on the basis of context or grammar.

As is well known in the art, most of the delay in recognizing an image in the character recognition circuit 100 of FIG. 1 is the time needed to generate the M (e.g., 4000) distance signals in the classifier 109 and to sort the M distance signals in the sorter 111 to form an ordered array of the best N (e.g., 100) candidates. The distance signal generating time may be reduced by forming distance signals in parallel. Sorting, however, requires that each distance signal Im be compared to every previously sorted distance signal. In accordance with the present invention, the time required for sorting is significantly reduced by a novel arrangement which overlaps the sorting of successive distance signals.

Figure 3:
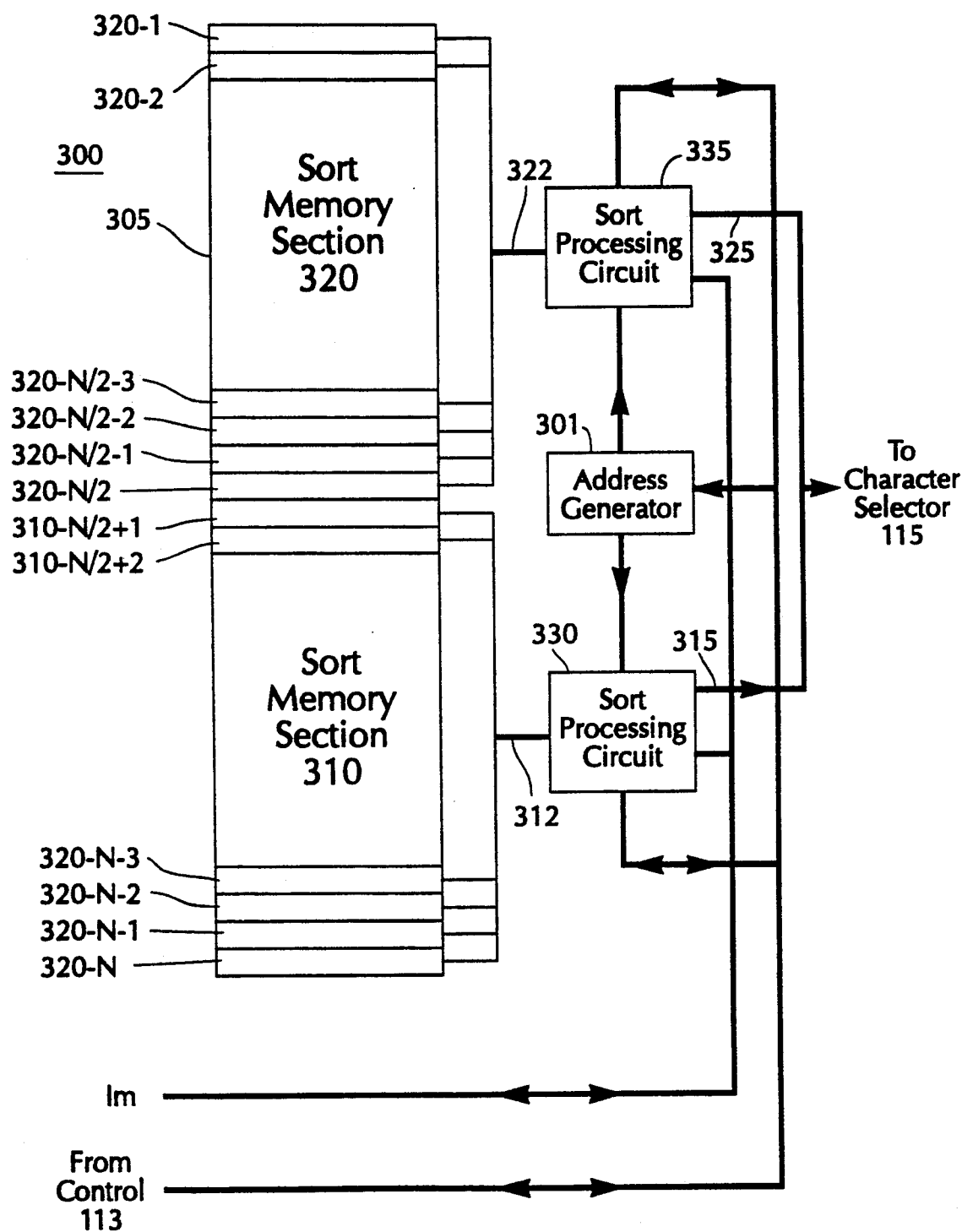
FIG. 3 depicts a block diagram of an embodiment of a sorter in accordance with the present invention that may be used in the character recognition circuit of FIG. 1.

FIG. 3 is a block diagram of an embodiment 300 of an overlapped sorting circuit that may be used as the sorter 111 in FIG. 1. Advantageously, the overlap architecture of the sorting circuit 300 speeds up the candidate sort significantly to achieve faster character recognition. The circuit 300 in FIG. 3 comprises a sort memory 305 which is partitioned into sort memory sections 310 and 320. Each sort memory section stores a portion of the sorted candidate codes (e.g., one half) and each memory section location stores a candidate identifier m and the distance signal Im generated for the candidate in the classifier 109. An address generator 301 produces a sequence of address signals to access data signals in sort memory sections 310 and 320. Each data signal in the memory includes a numeric value portion. The distance signals Im are compared to the numeric value portions of the data signals for sorting purposes. A sort processing circuit 330 receives the input distance signals Im from the classifier 109 of FIG. 1 and the address signals from the address generator 301 and performs the sort operations for the sort memory section 310. Similarly, a sort processing circuit 335 receives the distance signals Im from the classifier 109 and performs the sort operations for the sort memory section 320. The operations of the sort processing circuits 330 and 335 are overlapped so that the current distance signal Im is sorted among the data signals in the sort memory section 310 while the preceding distance signal Im−1 is sorted among the data signals in the sort memory section 320.

The sort memory section 310 comprises a set of N/2 individual cells 310-N/2+1, ..., 310-N arranged in order. Each cell (e.g., 310-N) stores a character identifier and a data signal (e.g., DN). The cells are individually coupled to the sort processing circuit 330 via a bus 312 which transfers signals between the cells and the sort processing circuit 330. Similarly, the sort memory section 320 comprises a set of individual cells 320-1, 320-2, ..., 320-N/2 arranged in order. The cells are coupled to the sort processing circuit 335 through a bus 322 and each cell (e.g., 320-1) stores a character identifier m and a data signal (e.g., D1). The address generator 301 operates through the sort processing circuits 330 and 335 to address the individual cells in the sort memory sections 310 and 320 in sequential order from the bottom to the top.

The data signals D1, D2, . . ., DN are arranged in a prescribed order in the sort memory sections 310 and 320 of FIG. 3. If the distance signals Im from the classifier 109 of FIG. 1 are sorted in the descending order to $D1 \geq D2 \geq \ldots \geq DN$, the best candidate has the largest distance signal (e.g., Mahalanobis distance metric). The sort memory section 320 stores the larger distance signal values. The largest distance signal is stored as signal D1 in the cell 320-1. The signals D1 through DN/2 are sorted into the cells 320-1 through 320-N/2 so that the order corresponds to the series $D1 \geq D2 \geq \ldots \geq DN/2$. The smaller distance signals are sorted into the sort memory section 310 in the order $DN/2+1 \geq DN/2+2 \geq \ldots \geq DN$. The data signal DN/2+1 is sorted into the cell 310-N/2+1 and the smallest distance signal Dn is sorted into the cell 310-N. Alternatively, the sorted distance signals may be arranged in the ascending order $D1 \leq D2 \leq \ldots \leq DN-1 \geq DN$ where the best candidate has the smallest distance signal (e.g., mean absolute and mean squared distance metrics). In this arrangement, the largest distance signal DN is sorted into the cell 310-N in the sort memory section 310 while the smallest distance signal D1 is sorted into the cell 320-1 in the sort memory section 320.

Figure 4:
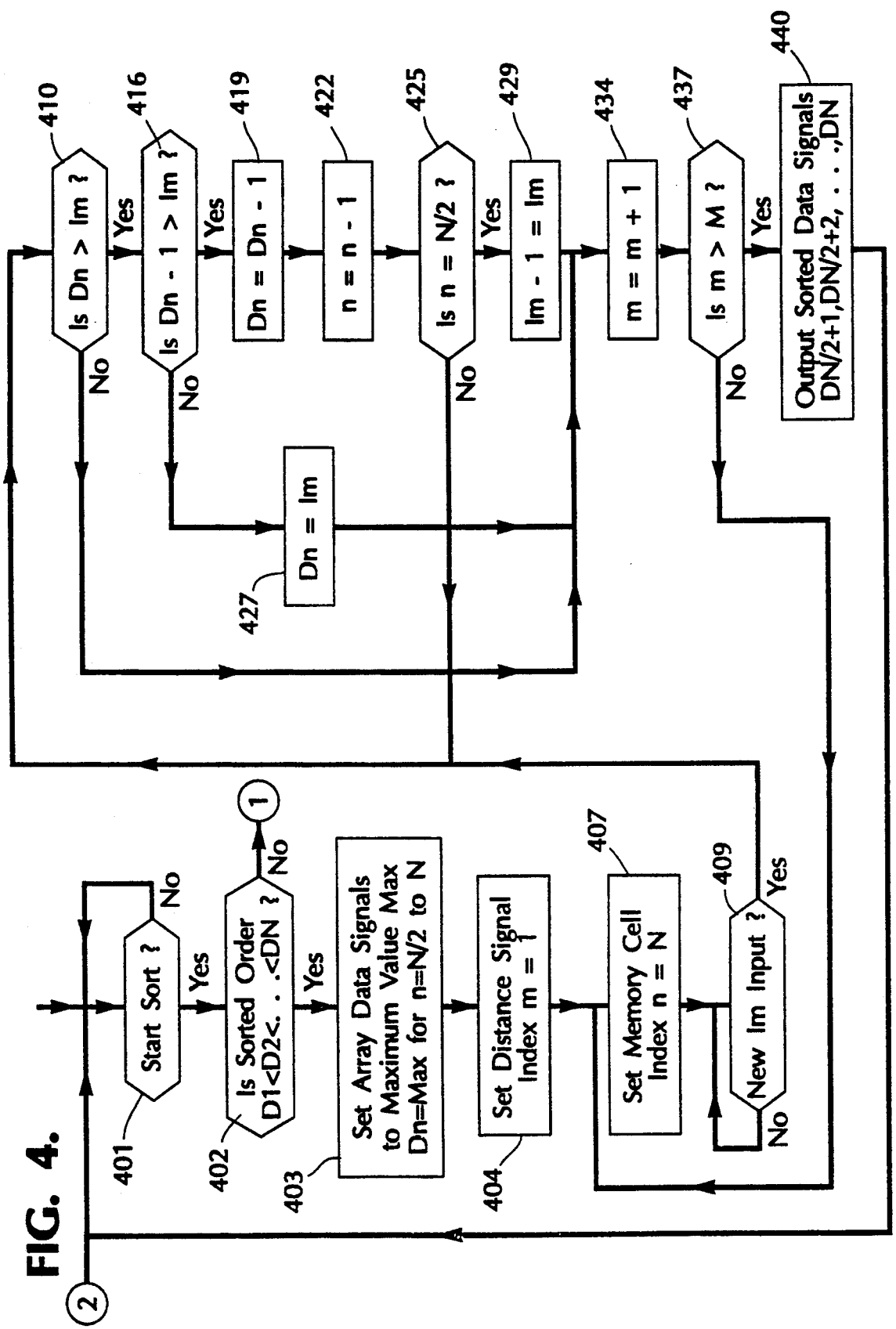
FIG. 4 is a flow chart illustrating ascending sort operations of one of the sort processing circuits in FIG. 3.
Figure 5:
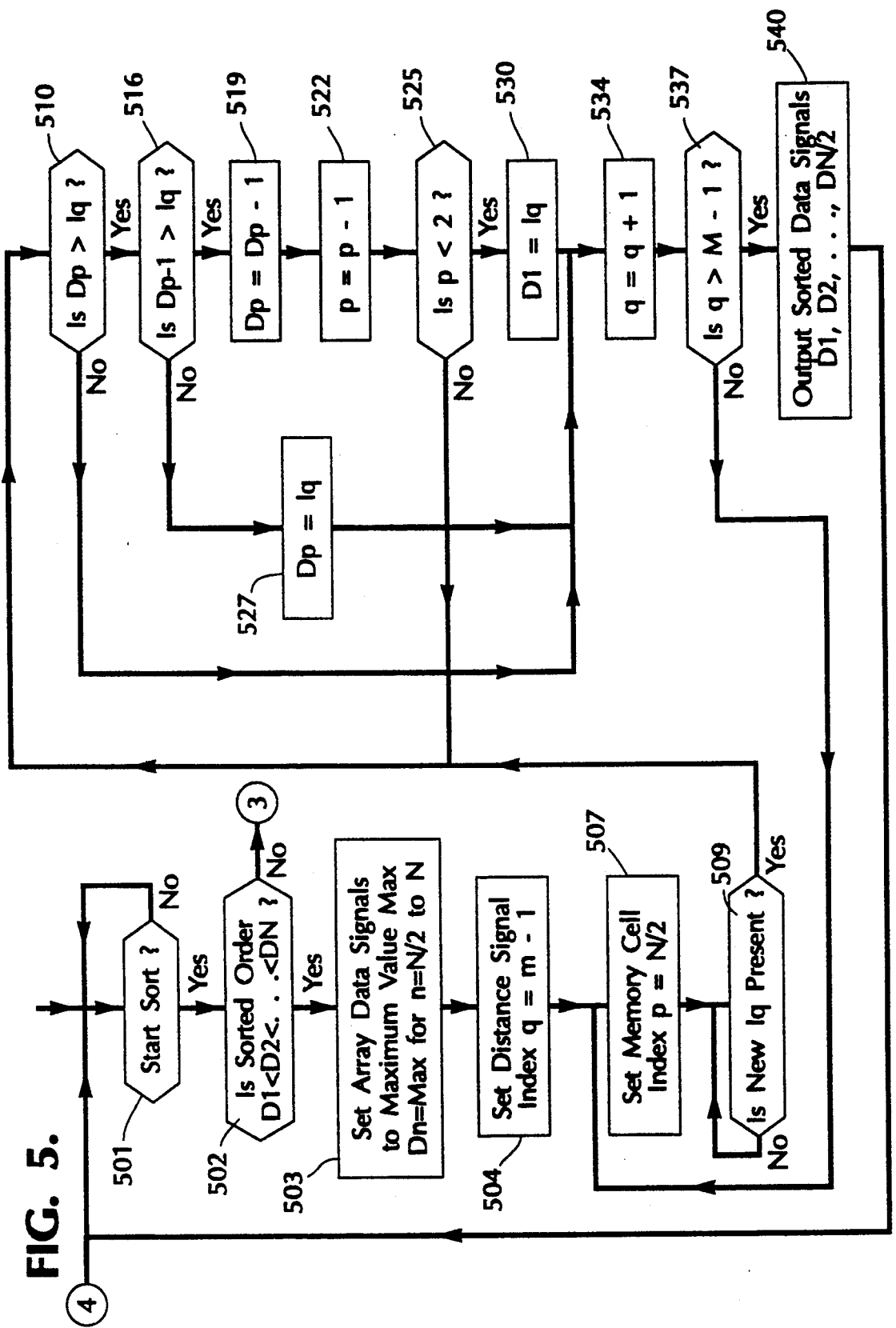
FIG. 5 is a flow chart illustrating ascending sort operations of the other sort processing circuit in FIG. 3.

FIGS. 4 and 5 are flow charts that illustrate the operation of the sorting circuit embodiment 300 in FIG. 3. The flow chart of FIG. 4 corresponds to instruction codes stored permanently in the sort processing circuit 330 and the flow chart of FIG. 5 corresponds to instruction codes stored permanently in the sort processing circuit 335. Alternatively, a state sequence arrangement well known in the art may be used to implement the flow charts of FIG. 4 and 5. The flow chart of FIG. 4 corresponding to the operations of the sort processing circuit 330 and the sort memory section 310 comprises a start sort decision step 401, a sort order decision step 402, an initial sort memory section setting step 403, a distance signal index setting step 404, a memory cell index setting step 407, a new input distance signal decision step 409, sorting operation steps 410, 416, 419, 422, 425, and 427, a distance signal transfer step 429, an input distance signal incrementing step 434, a last character decision step 437, and a sorted signal outputting step 440. The flow chart of FIG. 5, corresponding to the operations of the sort processing circuit 335 and the sort memory section 320, comprises a start sort decision step 501, a sort order decision step 502, an initial set data signal step 503, a distance signal index decision step 504, a memory cell index setting step 507, a new distance signal present decision step 509, sorting operation steps 510, 516, 519, 522, 525, 527, and 530, a character index incrementing step 534, a last character decision step 537, and a sorted signal outputting step 540.

The operation of the sorting circuit embodiment 300 is described with to reference to FIGS. 3, 4, and 5. Assume for purposes of illustration that the distance signals Im received by the sorting circuit embodiment 300 from the classifier 109 in FIG. 1 are formed using the mean absolute distance metric or the mean squared distance metric. The smallest distance signal which corresponds to the best candidate is sorted to the cell 320-1 in the sort memory section 320 as the data signal D1. The candidates are sorted in the ascending order $D1 \leq D2 \leq \ldots, \leq DN$ and the largest distance signal is sorted to the cell 310-N in the sort memory section 310 as the data signal DN. When the sort operations are initiated by a signal from the control 113 in FIG. 1 in the step 401 of FIG. 4, the address generator 301 in FIG. 3 is directed to address the cells of the sort memory section 310 sequentially through the sort processing circuit 330. A predetermined extreme value signal MAX greater than the maximum value distance signal expected is inserted into each memory cell 310 -N/2+1 through 310-N as per the step 403 in the flow chart of FIG. 4. Similarly, the address generator 301 and the sort processing circuit 335 cooperate to insert the MAX signal into the cells 320-1 through 320-N/2 of the sort memory section 320 as per the step 503 in the flow chart of FIG. 5.

In general, the embodiment 300 in FIG. 3 receives the sequence of classified distance signals I1, I2, . . ., Im, . . ., IM in successive time periods from the classifier 109 of FIG. 1 and supplies the distance signals to the sort processing circuits 330 and 335. For the ascending sort illustrated in the flow charts of FIGS. 4 and 5, the memory cells of the sort memory sections 310 and 320 are initially set to their maximum possible values. The setting of the data signals to the extreme value outside the range of the expected distance signals permits a rapid sort in one direction. In addition, the one direction sort allows concurrent sorts on different sections of the memory.

The distance signal Im is compared to the sequence of data signals DN, DN-1, . . ., DN/2+2, DN/2+1 in the memory cells of the sort memory section 310 to determine its place among these data signals in one time period. The distance signal Im is then compared to the sequence of data signals DN/2, DN/2-1, . . ., D2, D1 in the next time period to determine its position in the sorted array. The comparison of the distance signal Im with the data signals DN/2, DN/2−1, . ., D2, D1 in the sort memory section 320, however, does not require any use of the sort memory section 310. In accordance with the invention, the just received distance signal Im is compared sequentially to the data signals DN, DN−1, . . ., DN/2+2, DN/2+1 in the sort memory section 310 in the same time period concurrently with the comparison of the immediately preceding distance signal Im−1 to the data signals DN/2: DN/2−1, . . ., D2, D1 in the sort memory section 320. In this way, the sorting of succeeding distance signals is overlapped whereby the sorting time is significantly reduced.

The sorting of an individual distance signal in the sort memory section 310 or the sort memory section 320 is done by comparing the distance signal applied to the sort processing circuit associated with the memory section (e.g., Im) to the data signals Dn and Dn−1 in immediately successive memory cells 310-n and 310-n−1 or 320-n and 320-n−1 in FIG. 3. The stored signals Dn and Dn−1 are initially set to their maximum values. As a result, the value of the stored signal Dn is always greater than or equal to the value of the stored signal Dn−1. In the sorting process, the input distance signal Im is first compared to the stored distance signal Dn. If the stored data signal Dn is less than or equal to the input distance signal Im, the stored signal Dn and the succeeding stored distance signals remain unchanged. Otherwise, the input distance signal Im is compared to the next successive distance signal Dn−1. When the next successive distance signal Dn−1 is less than or equal to the input distance signal Im, the data signal Dn is replaced by the input distance signal Im. If the data signal Dn−1 is greater than the input distance signal, the data signal Dn is replaced by the next successful data signal Dn−1. Consequently, an input distance signal Im greater than the stored signal Dn does not affect the values of data signals Dn and Dn−1 and ends the comparisons in the sort memory section. An input distance signal Im intermediate the stored data signals Dn and Dn−1 causes the data signal Dn to be replaced by the input distance signal Im while the data signal Dn−1 remains unchanged. An input data signal Im less than the stored signal Dn−1 results in the stored signal Dn being replaced by the stored data signal Dn−1.

Assume for purposes of illustration that the signal Dn is 10 in the memory cell 310-n and the signal Dn−1 in the memory cell 310-n−1 is 8. Consider an input distance signal Im=7. Since Im=7 is less than Dn=10, it is compared to the data signal Dn−1=8. As the input distance signal is less than 8, the stored data signal is replaced by the next successive data signal $D_n-1=8$. For an input distance signal Im=11, the stored signals Dn and Dn−1 remain 10 and 8, respectively and comparisons in the sort memory section are completed. Where the input distance is signal Im=9 intermediate data signal Dn=10 and Dn−1=8, the stored data signal Dn=10 is replaced by the input distance signal Im=9. It is readily seen from the aforementioned examples that the stored signals Dn+1 through DN are not affected by the sort operations on the stored signals Dn and Dn−1. Thus, sort operations on the next succeeding distance signal may be performed with respect to the stored signals Dn+1 through DN. In the embodiment 300 of FIG. 3, the sort memory section 310 and the sort processing circuit 330 operate to sort the input distance signal Im among the stored signals DN through DN/2 while the sort memory section 320 and the sort processing circuit 335 are concurrently sorting the immediately preceding distance signal Im−1 among the stored signals DN/2 through D1.

Referring to the flow chart of FIG. 4, the sort processing operations are started when the control 113 of FIG. 1 sends a start sort signal to the sort processing circuit 330 of FIG. 3 as per the step 401. Where the ascending sort is to be performed, the data signals in the sort memory section 310 are initially set to their maximum values in the step 403. The step 404 is entered from the array setting step 403. In the step 404, the input distance signal index m is initially set to one to receive the first distance signal from the classifier 109 of FIG. 1. The step 407 is then entered wherein the memory cell index n is set to N so that the cell 310-N is addressed. When a new distance signal Im is received from the classifier 109 of FIG. 9, the sorting operation steps 410 through 427 are performed. In this way, the current input distance signal Im is sorted with respect to the data in the memory cells 310-N to 310-N/2.

In the step 410, the signal Dn in the addressed cell is transferred to the sort processing circuit 330 and the input distance signal Im is compared to the addressed signal Dn. If the signal Dn in the addressed cell is greater than the distance signal Im in the step 410, the step 416 is entered. If, however, the data signal Dn in the addressed cell is less than or equal to the input distance signal Im, the step 434 is entered directly from the step 410 and the sorting of the distance signal Im in the sort memory 305 is completed.

Where the data signal Dn is greater than the input distance signal Im in the step 410, the signal Dn−1 is obtained from the sort memory section 310 and is compared to the input distance signal Im in the step 416. When the distance signal Dn−1 is greater than the input distance signal Im, the data signal Dn is replaced by the data signal Dn−1 in the step 419. If, however, the distance signal Dn−1 is less than or equal to the input distance signal Im in the step 416, the data signal Dn is replaced by the distance signal Im in the step 427 and the distance signal Im is placed in its sorted position in the sort memory section 310.

When the data signal Dn is replaced by the data signal Dn−1 in the step 419, the memory cell index n is decremented in the step 422 and the decremented index n is compared to N/2 in the decision step 425. Until the index n is decremented to N/2 or the loop from the step 410 to the step 425 is exited through the decision step 410 or the decision step 416, the loop from the step 410 to the step 425 is iterated to sort the input distance signal Im among the stored signals DN through DN/2. When n equals N/2+1, the signal DN/2 stored in the cell 320-N/2 of the sort memory section 320 is compared to the input data signal Im in the step 416. The signal DN/2 may then be transferred to the cell 310-N/2+1 in the sort memory section 310 in the step 419.

After the distance signal index m incrementing step 434 is entered from steps 410, 427 or the step 429, the input distance signal Im has been sorted among the stored signals DN, DN−1, . . . , DN/2+1 in the sort memory section 310. The input distance signal index m is incremented in the step 434. Until the last character index signal M is processed, the step 407 is reentered via the decision step 437 so that the next successive input distance signal is sorted among the stored signals of the sort memory section 310. The sort memory section 320 and the sort processing circuit 335 operate in similar fashion to sort the distance signal Im among the stored signals D1 through DN/2 in the memory cells 320-1 through 320-N/2, respectively.

FIG. 5 illustrates the operation of the sort memory section 320 and the sort processing circuit 335. Referring to FIG. 5, the decision step 501 is entered when the sort operation is started. In the decision step 502, the sort order is determined. For an ascending sort order, the data signals D1 through DN/2 in the sort memory section 320 are initially set to their maximum values. The distance signal index q for the sort memory section 320 is set to m−1 in the step 504 so that the distance signal just sorted in the sort memory section 310 is used in the operations of the sort memory section 320 and the sort processing circuit 335. The stored data signal index p for the sort memory section 320 is set to N/2 in the step 507 and the cell 320-N/2 is addressed. Upon detection of a new distance signal Iq from the sort processing circuit 330, the sorting operation steps 510 through 527 are entered. These operating steps are iterated whereby the distance signal Iq=Im−1 is sorted with respect to the data in the memory cells 320-N/2 to 320-1.

In the step 510, the signal Dp in the addressed cell is transferred to the sort processing circuit 335 and input distance signal Iq is compared to the addressed signal Dn. If the signal Dn in the addressed cell is greater than the distance signal Iq in the step 510, the step 516 is entered. If, however, the data signal in the addressed cell Dn is less than or equal to the input distance signal Iq, the sorting of the distance signal Iq in the sort memory section 320 is completed and the step 534 is entered.

Where the data signal Dp is greater than the input distance signal Im in the step 510, the signal Dp-1 is obtained from the sort memory section 320 and is compared to the input distance signal Iq in the step 516. When the distance signal Dp-1 is greater than the input distance signal Iq, the data signal Dp is replaced by the data signal Dp-1 in the step 519. If, however, the data signal Dp-1 is less than or equal to the input distance signal Iq in the step 516, the data signal Dp is replaced by the distance signal Iq in the step 527.

When the data signal Dp is replaced by the data signal Dp-1 in the step 519, the memory cell index p is decremented in the step 522 and the decremented index p is compared to 2 in the decision step 525. As long as the index p is greater than or equal to 2, the loop from the step 510 to the step 525 is iterated. If p is one in the step 525, the distance signal Iq is smaller than the data signals D2 through DN/2. The step 530 is entered and the distance signal Iq is placed in the data signal D1 location 320-1 of the memory section 320. The sort operations of the loop may be exited through the step 510, the step 516 or the step 530. Upon completion of the loop iterations or the alternative exits therefrom, the input distance signal Im is placed in a position among the data signals DN/2 through D1 of the memory section 320 according to its comparative value.

After the input distance signal Im has been sorted among the stored signals DN/2, DN/2−1, . . . , D1 in the sort memory section 320, the distance signal index q incrementing step is entered. The input distance signal index q is incremented in the step 534. Until the last character index signal M is processed, the step 507 is reentered via the decision step 537 so that the next successive input distance signal is sorted among the stored signals of the sort memory section 320. The step 540 is entered from the decision step 537 after the last character distance signal IM has been sorted and the signals D1, D2, . ., DN/2 are outputted from the sorter 111.

In the event that the descending sort is to be performed in the sorter circuit embodiment 300 of FIG. 3, the operations of sort processing circuits 330 and 335 are altered to provide the sort order $D1 \geq D2 \geq . . \geq DN-1 \geq DN$. The operations of the sort memory section 310 and the sort processing circuit 330 for the descending sort order are shown in the flow chart of FIG. 6. The flow chart of FIG. 6 comprises an array data setting step 603, a distance signal index setting step 604, a memory cell index setting step 607, a new input distance signal detecting step 609, sort operation steps 610 through 627, a next sort memory section input setting step 629, a distance signal index incrementing step 634, a last character decision step 637, and a sorted data signal outputting step 640. The operations of the sort memory section 320 and the sort processing circuit 335 for the descending sort order are shown in the flow chart of FIG. 7. The flow chart of FIG. 7 comprises an array data setting step 703, a distance signal index decision step 704, a memory cell index setting step 707, a new input distance signal detecting step 709, sort operation steps 710 through 730, a distance signal index incrementing step 734, a last character decision step 737, and a sorted data signal outputting step 740. The operation of the flow chart of FIG. 6 starts in the array data signal setting step 602 which is entered from a "no" decision in the step 402 of FIG. 4. In the step 602, the array data signals DN/2 through DN of the sort memory section 310 are initially set to the minimum possible value signals. The distance signal index m is set to one in the step 604 and the memory cell index n is set to N in the step 607. Sort operation steps 610, 616, and 619 are adapted to sort in the reverse order than shown in the corresponding steps 410, 416, and 419 of FIG. 4. In the step 610, the data signal Dn in the addressed cell is transferred to the sort processing circuit 330 and input distance signal Im is compared to the addressed data signal Dn. If the data signal Dn in the addressed cell is less than or equal to the input distance signal Im in the step 610, the step 616 is entered. If, however, the data signal Dn in the addressed cell is greater than the input distance signal Im, the step 634 is entered directly from the step 610 and the sort for the signal Im is completed.

Where the data signal Dn is less than or equal to the distance signal Im, the data signal Dn−1 is obtained from the sort memory section 310 and is compared to the input distance signal Im in the step 616 When the data signal Dn−1 in the next successive Dn−1 memory cell is greater than the input distance signal Im, the data signal Dn is replaced by the input distance signal Im in the step 627 and the sort operations for the signal Im in the memory 310 are completed. When the data signal Dn is less than or equal to the input distance signal Im, the data signal Dn is replaced by the next successive data signal Dn−1 in the step 619. The data signal index n is decremented in the step 622 and the decremented index is compared to N/2 in the step 625. Step 607 is reentered from the step 625 until the data signal index n is equal to N/2 or the loop from the step 610 to the step 625 is exited through the step 610 or the step 616. When n equals N/2+1, the data signal DN/2 stored in the cell 320-N/2 of the sort memory section 320 is compared to the input data signal Im in the step 616. The data signal DN/2 may then be transferred to the cell 310-N/2+1 in the sort memory section 310 in the step 619.

Assume for purposes of illustrating the descending sort that the data signal Dn is 5 in the memory cell 310-n and the data signal Dn−1 in the memory cell 310-n−1 is 8. Consider an input distance signal Im=3. Since Im=3 is less than Dn=5, the data signals Dn and Dn−1 in the memory cells 310-n and 310-n−1, respectively, remain unchanged. For an input distance signal Im=11 greater than the data signal Dn−1, the stored data signal Dn is replaced by the value of the data signal Dn−1 so that Dn is changed to 8. Where the input distance signal Im is 7, it is intermediate the data signals Dn and Dn−1. The data signal Dn is replaced by the input distance signal Im=7. As in the arrangement of FIG. 4, it is readily seen that the stored signals Dn+1 through DN are not affected by the sort operations on the stored signals Dn and Dn−1. Consequently, sort operations on the next succeeding distance signal may be performed with respect to the stored signals Dn+1 through DN concurrently with the sort operations for stored signals Dn and Dn−1.

When the memory cell index n is equal to N/2 in the decision step 625, the distance signal Im−1 for the sort memory section 320 is set to the signal Im in the step 629. The distance signal index m is incremented in the step 634 and the memory cell setting step 607 is reentered for the next succeeding input distance signal via the decision step 637. After the distance signal IM for last character M has been sorted in the sort memory section 310, the step 640 is entered from the decision step 637 and the sorted data signals DN/2+1, DN/2+2, . . ., DN are outputted from the sorter 111 of FIG. 4. The step 401 of FIG. 4 is then reentered from the outputting step 640.

Figure 7:
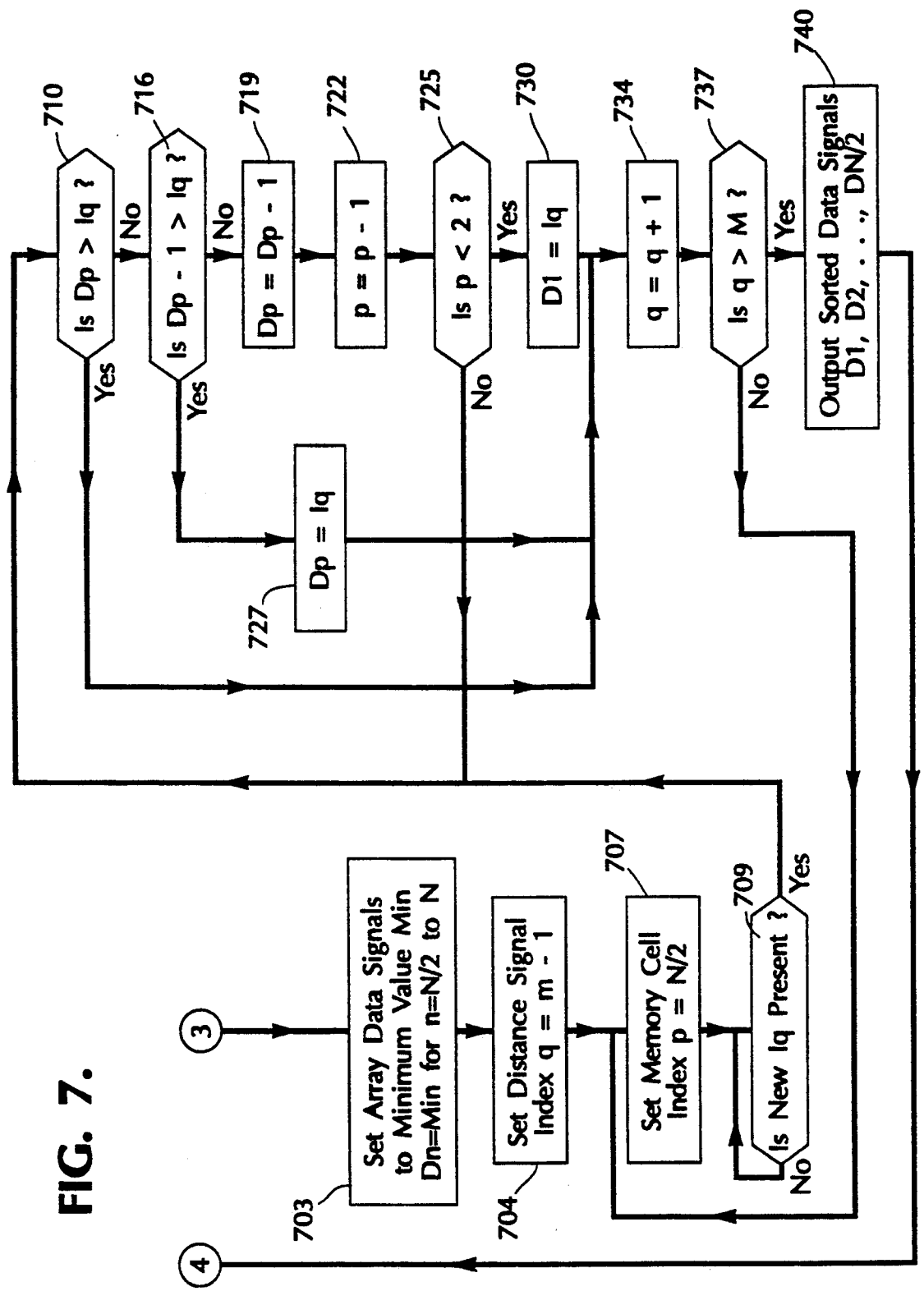
FIG. 7 is a flow chart illustrating descending sort operations of the other sort processing circuit in FIG. 3.

FIG. 7 illustrates the operation of the sort memory section 320 and the sort processing circuit 335 for the descending sort. Referring to FIG. 7, the decision step 703 is entered from the decision step 502 when the descending sort order is detected. For the descending sort order, the data signals D1 through DN/2 in the sort memory section 320 are initially set to their minimum values in the step 703. The distance signal index q for the sort processing circuit 335 is set to m−1 in the decision step 704.

The stored data signal index p for the sort memory section 320 is set to N/2 in the step 707 so that the cell 320-N/2 is addressed. The sorting operation steps 710 through 727 are then iterated whereby the distance signal Im−1 is placed in the memory 320 according to its value with respect to the values of the data signals in the memory cells 320-N2 to 320-1. The sort operations of the flow chart of FIG. 7 in the steps 710 through 727 with respect to the sort memory section 320 and the sort processing circuit 335 are substantially similar to the operations described with respect to the steps 610 through 627 of FIG. 6.

If the index p is less than 2 in the step 725, the step 730 is entered and the distance signal Iq is placed in the data signal D1 location 320-1 of the memory section 320 as the largest signal. When the sort operation loop is exited through step 710, 716 or 730, the input distance signal Iq has then been sorted among the stored signals DN/2 through D1. The distance signal index m incrementing step 734 is entered from the decision step 725, the step 727 or the step 730 and the input distance signal index m is incremented in the step 734. Until the last character index signal M is processed, the step 707 is reentered so that the next successive input distance signal is sorted among the stored signals of the sort memory section 320. After the distance signal IM has been sorted among the signals D1, D2, . . ., DN/2, the step 740 is entered from the decision step 737 and the sorted signals D1, D2, . . ., DN/2 are outputted from the sorter 111. The step 501 of the flow chart of FIG. 5 is then reentered to await the next start sort signal from the control 113 of FIG. 1.

Figure 8:
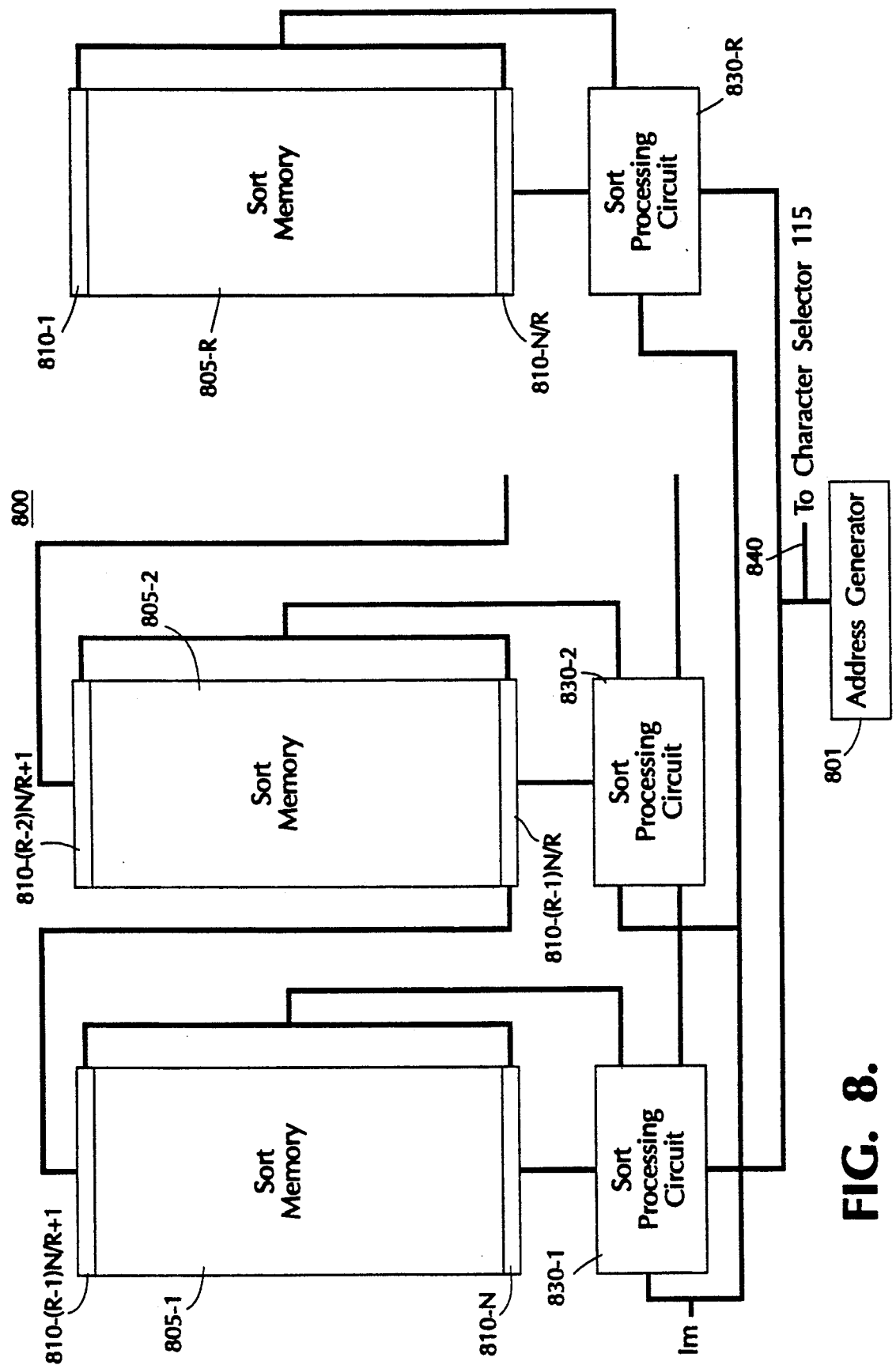
FIG. 8 depicts a block diagram of an embodiment of another sorter in accordance with the present invention that may be used in the character recognition circuit of FIG. 1.

FIG. 8 shows a block diagram of an embodiment 800 of a circuit arranged to overlap the sorting of a sequence of R (e.g., 10) distance signals received from the classifier 109 of FIG. 1. The sorting circuit embodiment 800 comprises R separate sort memories 805-1, 805-2, . . ., 805-R. The sort memories 805-1, 805-2, . . ., 805-R are coupled to sort processing circuits 830-1, 830-2, . . ., 830-R, respectively, and to a common address generator 801. The address generator cooperates with the sort processing circuits 830-1 through 830-R to perform the sort operations. The address generator 801 addresses the individual cells in the sort memories 805-1, 805-2, . . ., 805-R through the sort processing circuits 830-1 through 830-R in sequential order from the bottom to the top so that corresponding cell positions are addressed.

As described with respect to FIG. 3, each sort memory in FIG. 8 stores a predetermined number of the candidate codes being sorted. Each sort memory comprises a set of N/R cells which stores N/R data signals D1, D2, . . ., DN. The sort memory 805-1 stores the signals DN, DN−1, . . ., DN/R+1 in the cells 810-N through 810-(R−1)N/R+1 from bottom to top. The sort memory 805-2 stores the signals D(R−1)N/R, D(R−1)N/R−1, . . ., D(R−2)N/R+1 in the cells 810-(R−1)N/R through 810-(R−2)/N/R+1 and the sort memory 805-R stores the signals DN/R through D1 in the cells 810-N/R through 810-1. Each cell of the sort memories 805-1 through 805-R is initially reset to a predetermined extreme value that is outside the range of the values of the signals Im from the classifier 109 of FIG. 1. If the sort order is D1≦D2≦. . . ≦DN, the predetermined extreme value is greater than the largest input signal value. If the sort order is D1≧D2≧. . . ≧DN, the predetermined extreme value is less than the smallest input signal value.

The sort processing circuit 830-1 receives the input distance signal sequence Im (m=1, 2, . . ., M) from the classifier 109 of FIG. 1 and performs the sort operations needed to sort the distance signal Im among the signals stored in the sort memory 805-1. The sort processing circuit 830-2 receives the distance signals Im from the classifier 109 via the sort processing circuit 830-1 and sorts the distance signal Im-1 among the stored signals of the sort memory 805-1. The sort processing circuit 830-R receives the distance signals from the classifier 109 via preceding sort processing circuit and sorts the distance signal Im-R among the distance signals in the sort memory 805-R. The sorting operations of each sort processing circuit are substantially similar to the operations described with respect to the embodiment 300 of FIG. 3 and shown in the flow charts of FIGS. 4 through 7. After the distance signals I1 through IM have been sorted, the best N candidates are in the prescribed order in memories 810-1 through 810-R. The best candidates are transferred to the classifier 109 via line 840.

The sort processing circuits 830-1 through 830-R operate concurrently on a sequence of R distance signals. While the distance signal Im is sorted with the signals DN through D[(R−1)N/R+1] stored in the sort memory 805-1, the distance signal Im−1 is sorted with the signals D[(R−1)N/R] through D[(R−2)N/R+1] stored in the sort memory 805-2 and the distance signal Im-R is sorted among the signals DN/R through D1 in stored in the sort memory 805-R. In this way, the distance signal sorting is overlapped by a factor of R. As a result, the sorting time is reduced by the factor R. After the sort of the last distance signal IM, the signals in the sort memories 805-1 through 805-R are arranged in the order D1≧D2≧. . . ≧DN for the descending sort or in the order D1≦D2≦. . . ≦DN for the ascending sort. When the last distance signal IM has been sorted through the sort memories 810-1 through 810-R, the sorted array is applied to the classifier circuit 115 of FIG. 1 via a line 840.

Figure 9:
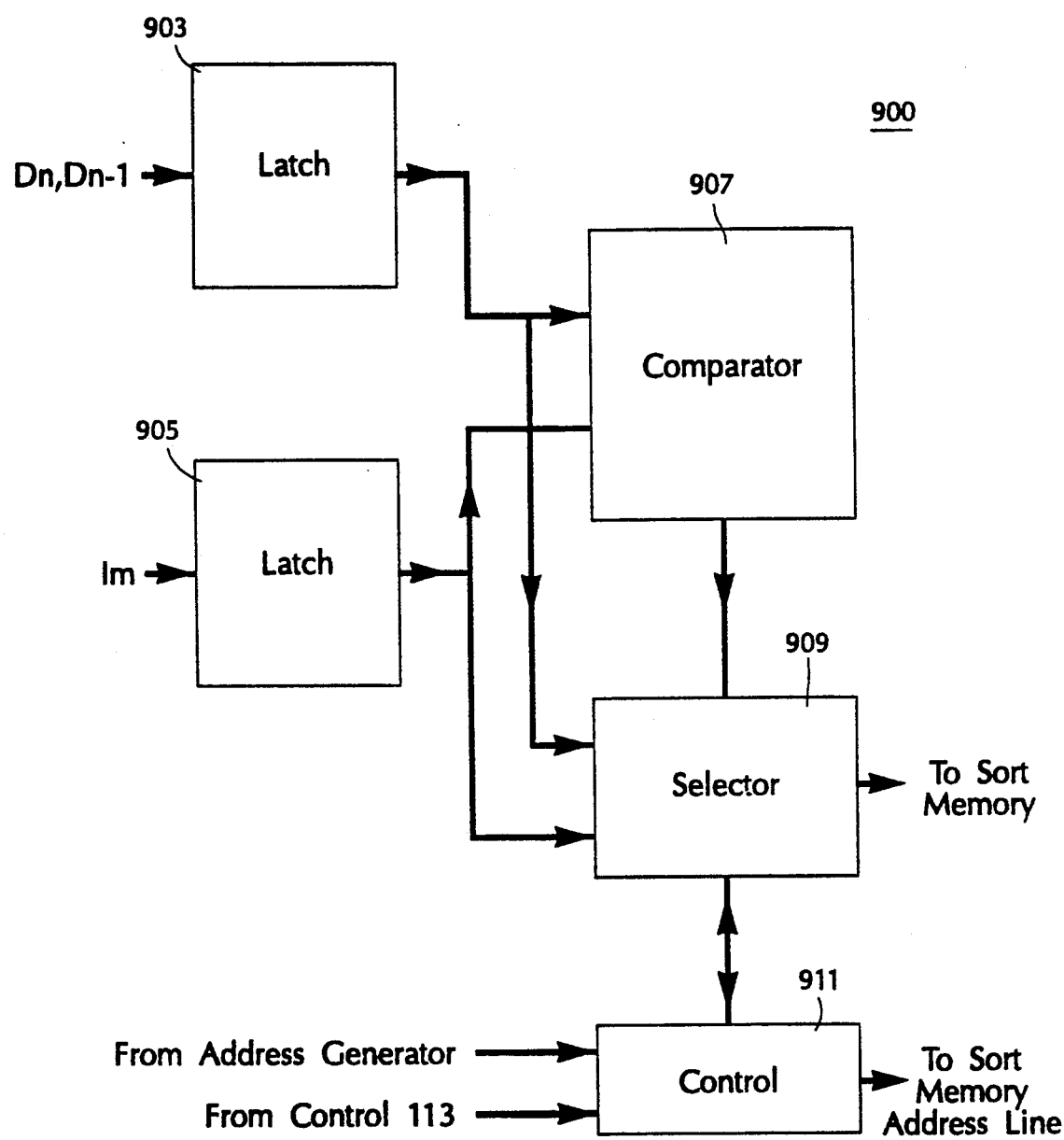
FIG. 9 depicts a block diagram of circuit embodiment that may be used as the sort processing circuit in FIGS. 3 and 8.

Referring to FIG. 9, there is shown an embodiment 900 of a sort processing circuit that may be used in the sorters of FIGS. 3 and 8. The embodiment 900 comprises logic circuits well known in the art for carrying out the operations shown in the flow charts of FIGS. 4 through 7. A latch 903 is adapted to store the data signals Dn and Dn−1 from successive locations of a sort memory section. A latch 905 is adapted to store the distance signal Im being sorted. A comparator 907 compares the signal Dn−1 in the latch 903 with the signal in the latch 905. A selector 909 selects either the signal Im or the data signal Dn−1 based on the output of the comparator 907, and a control 911 determines the sequence of operations of the embodiment 900.

In the operation the embodiment 900 as a sort processing circuit (e.g., 330 in FIG. 3 according to the flow chart of FIG. 4), the control 911 performs the initial operations of the steps 401 through 409 of FIG. 4. In the sorting operations of the steps 410 through 427, the control 911 receives address signals from the address generator 301. The control 911 applies an address signal to the sort memory section 310 to address the Dn and Dn−1 data signals therein. The distance signal Im is stored in the latch 905 and the data signal Dn is stored in the latch 903. The comparator 907 compares the data signal Dn with the distance signal Im as per the step 410. As a result of the comparison, the comparator 907 either sends a signal to the control to transfer the distance signal Im to the sort processing circuit 335 (step 429) or to start the comparison of the data signal Dn−1 with the distance signal Im (step 416).

In the event step 416 is entered from the step 410, the control 911 addresses the Dn−1 data signal location in the sort memory section 310. The comparator 907 compares the Dn−1 data signal in the latch 903 to the distance signal Im in the latch 905 and causes the selector 909 to apply either the data signal Dn−1 or the distance signal Im to the Dn data signal location in the sort memory section 310 (steps 419 and 427). The control then performs the data signal and distance signal index operations in accordance with the steps 407, 434, 437, and 440 of FIG. 4.

Figure 10:
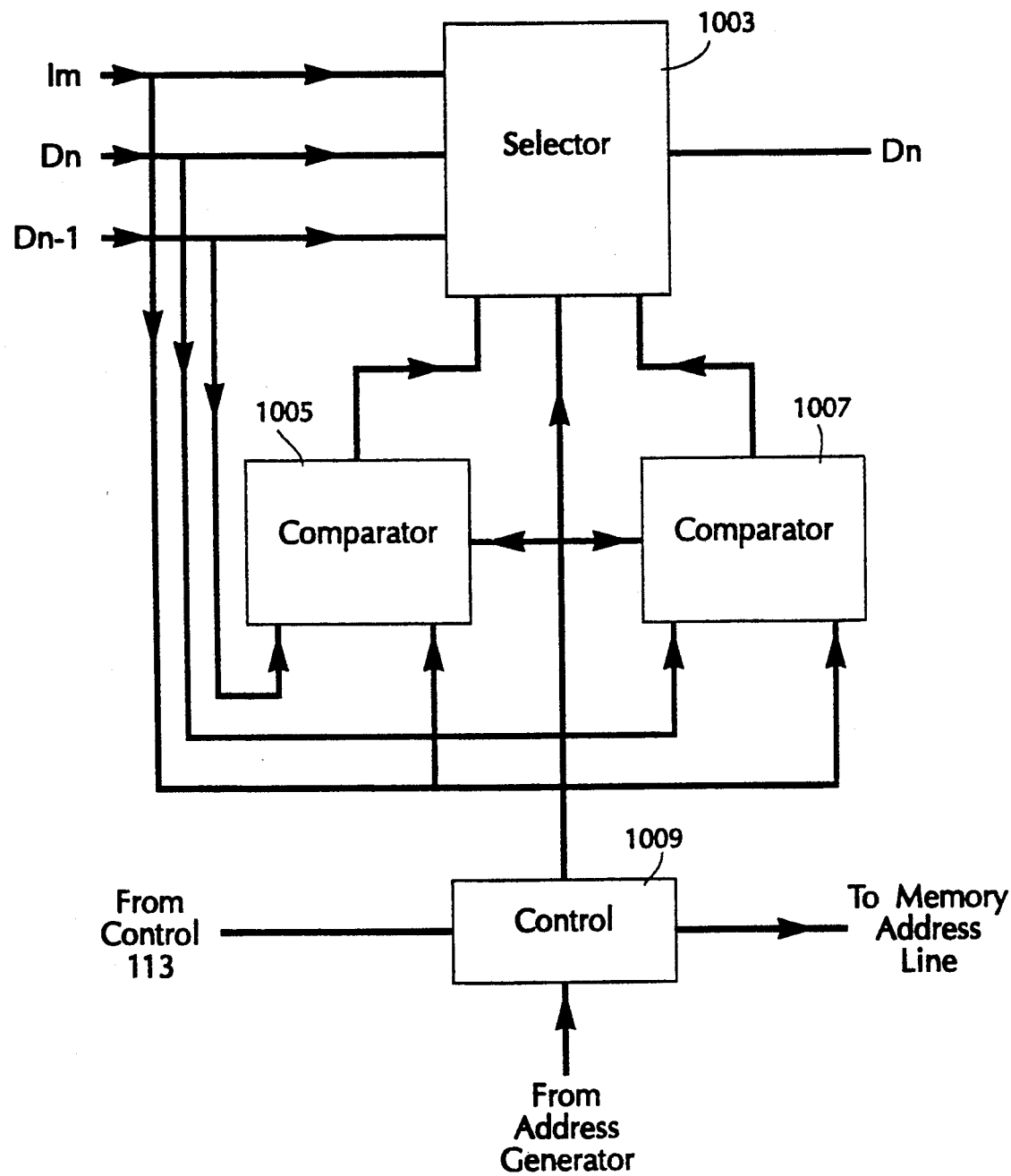
FIG. 10 depicts a block diagram of another circuit embodiment that may be used as the sort processing circuit in FIGS. 3 and 8.

Referring to FIG. 10, there is shown an embodiment 1000 of a logic circuit that may also be used as the sort processing circuit in FIGS. 3 and 8. The embodiment 1000 comprises a control 909, comparators 1005 and 1007, and a three state selector 1003. The operation of the embodiment 1000 is substantially similar to that described with respect to the embodiment 900 in performing the operations of the flow chart of FIG. 4. The control 1009 operates in the same manner as the control 911 in FIG. 9. Since a three state selector is used, the distance signal Im is compared with the data signal Dn in the comparator 1007 while the distance signal Im is compared with the data signal Dn−1 in the comparator 1005. Consequently, the embodiment 1000 performs the sorting operations faster.

For the ascending sort illustrated, for example, in the flow chart of FIG. 4, the output of the comparator 1007 reflects whether the data signal Dn in a selected memory location is greater than or less than or equal to the distance signal Im. The output of the comparator 1005 reflects whether the next successive data signal in the sort memory is greater than or less than or equal to the distance signal Im. The output of the selector 1003 is coupled to the selected memory location for the data signal Dn. If data signals Dn and Dn−1 are both greater than the distance signal Im, comparators 1005 and 1007 cause the selector 1003 to output the data signal Dn−1. If the data signal Dn is less than or equal to the distance signal Im, comparators 1005 and 1007 cause the selector 1003 to output the data signal Dn. In the event that the data signal Dn is greater than the distance signal Im but the next successive data signal Dn−1 is less than or equal to the distance signal Im, comparators 1005 and 1007 cause the selector 1003 to output the data signal Im.

Figure 6:
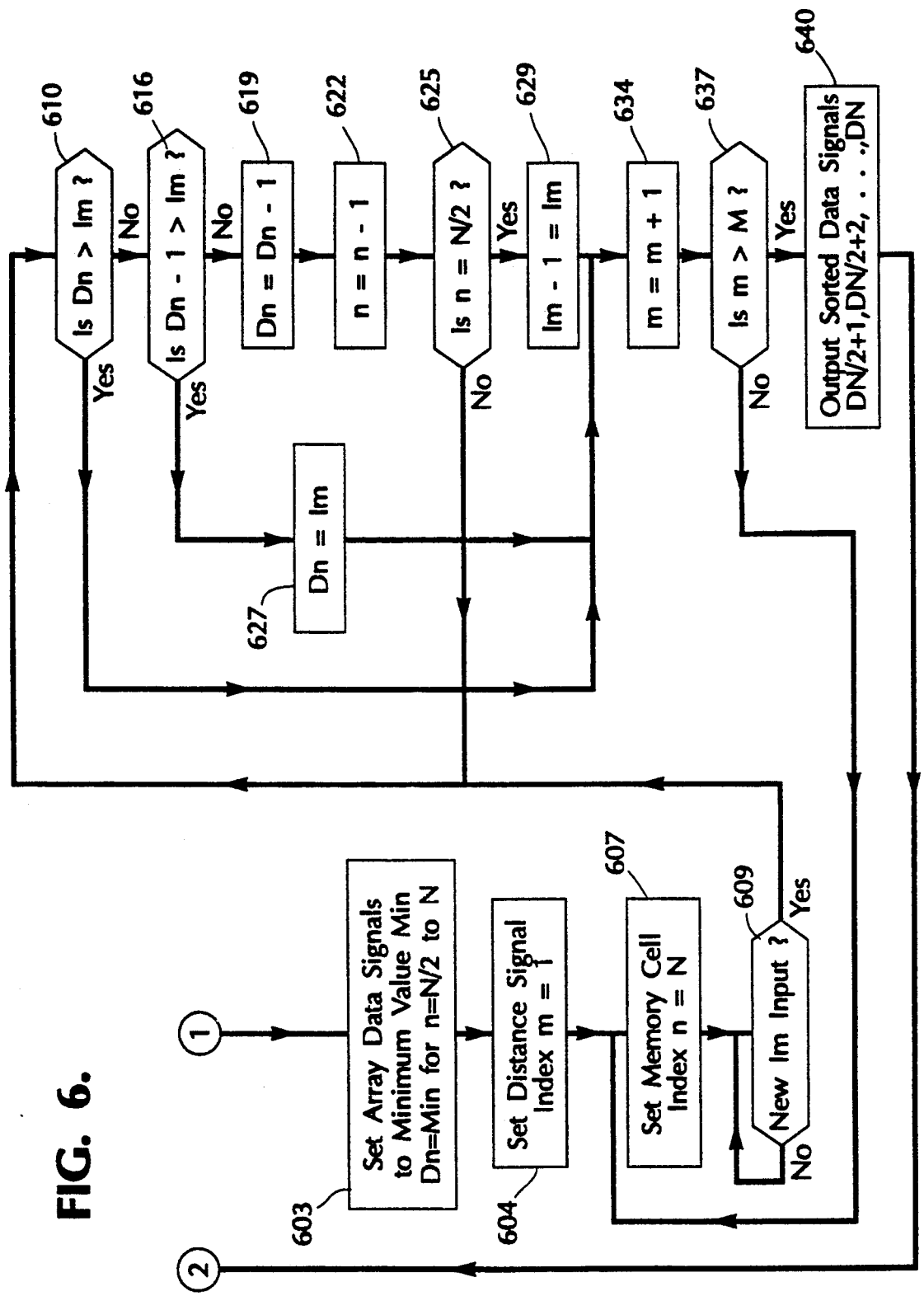
FIG. 6 is a flow chart illustrating descending sort operations of one of the sort processing circuits in FIG. 3.

In the descending sort illustrated, for example, in the flow chart of FIG. 6, the sort decisions are reversed. When the comparators 1105 and 1007 are in states that indicate the data signals Dn and Dn−1 are both less than or equal to the distance signal Im, comparators 1005 and 1007 cause the selector 1003 to couple the data signal Dn-1 to the data signal Dn memory location. If the data signal Dn is greater than the distance signal Im, comparators 1005 and 1007 prevent the selector 1003 from coupling an output to the data signal Dn memory location. The data signal Dn then remains unchanged. In the event the data signal Dn is less than or equal to the distance signal Im while the data signal Dn−1 is greater than the distance signal Im, comparators 1005 and 1007 cause the selector 1003 to output the distance signal Im to the data signal Dn memory location.

The invention has been described with reference to illustrative embodiments thereof, it is to be understood that many different modifications and changes may be made by those skilled in the art without departing from the spirit and scope of the invention.

What is claimed is:

1. In an apparatus having a memory partitioned into at least first and second memory sections of storage locations, a method for sorting input signals Im comprising the automated steps of:

storing a data signal having a predetermined extreme value in the storage locations of the first and second memory sections;

sequentially receiving input signals Im including a first input signal in successive time periods, each input signal Im having a value other than the predetermined extreme value; and sorting the successively received input signals Im among the storage locations in said first and second memory sections of the memory in a prescribed order comprising:

in each time period, a first comparing step of comparing the value of the input signal Im received in the time period with the values of each of said data signals in the storage locations of the first memory section to store the input signal Im received in the time period in one of the storage locations according to its value among the data signals of the first memory section storage locations; and in each time period, a second comparing step of comparing the value of an input signal Im−1 received in an immediately preceding time period with the value of each of said data signals in the storage locations of the second memory section to store the input signal Im−1 received in the immediately preceding time period in one of the storage locations according to its value among the data signals of the second memory section storage locations;

wherein the first input signal is stored so as to replace the predetermined extreme value stored in the last-compared storage location of the second memory section.

2. The method of claim 1 wherein the predetermined extreme value is greater than the largest input signal value.

3. The method of claim 2, wherein:

a data signal Dn in each storage location of said first and second memory sections has a value greater than or equal to a data signal Dn−1 in the next successive storage location of said first and second memory sections; and wherein the first and second steps of comparing the value of the input signal to the values of the data signals in the storage locations of said first and second memory sections comprises the steps of:

sequentially comparing the value of the input signal to the values of the data signals Dn and Dn−1 in each successive pair of storage locations in said respective first and second memory sections;

replacing the compared data signal Dn with the input signal responsive to the value of the next successive data signal Dn−1 being less than the value of the input signal; and replacing the data signal Dn with the next successive data signal Dn−1 responsive to the value of the input signal being less than or equal to the value of the next successive data signal Dn−1.

4. The method of claim 3, wherein the second comparing step of comparing the value of the input signal Im−1 with the values of the data signals in the storage locations of said second memory section includes the step of storing the input signal Im−1 according to its value among the data signals responsive to the value of the input signal Im−1 being less than the value of all the data signals in all the storage locations of said first and second memory sections.

5. The method of claim 4, wherein the step of storing includes storing a character identifier with each input signal Im−1.

6. The method of claim 1 wherein the predetermined extreme value is less than the smallest input signal value.

7. The method of claim 6, wherein:
a data signal Dn in each storage location of said first and second memory sections has a value less than or equal to a data signal Dn−1 in the next successive memory section location; and
wherein the first and second steps of comparing the value of the input signal to the values of the data signals in the storage locations of said first and second memory sections comprises the steps of:
replacing the compared data signal Dn with the input signal responsive to the value of the next successive data signal Dn−1 being greater than the value of the input signal; and
replacing the data signal Dn with the next successive data signal Dn−1 responsive to the value of the input signal being greater than or equal to the value of the next successive data signal Dn−1.

8. The method of claim 7, wherein the second comparing step of comparing the value of the input signal Im−1 with the values of the data signals in the storage locations of said second memory section includes the step of storing the input signal Im−1 according to its value among the data signals responsive to the value of the input signal Im−1 being greater than the value of all the data signals in all the storage locations of said first and second memory sections.

9. The method of claim 8, wherein the step of storing includes storing a character identifier with each input signal Im−1.

10. Apparatus for sorting input signals Im, comprising:
a memory comprising N data storage locations partitioned into at least first and second memory sections of storage locations, a data signal having a predetermined extreme value being stored in each of said storage locations of the first and second memory sections;
means for sequentially receiving input signals Im including a first input signal in successive time periods, each of said input signals Im having a value other than the predetermined extreme value; and
means responsive to the input signals Im received in the successive time periods and the data signals in the storage locations of the first and second memory sections for sorting the successively received input signals Im among the storage locations of the first and second memory sections in a prescribed order comprising:
first comparing means, operative in each time period, responsive to one of said input signals Im received in the time period and the data signals in the storage locations of the first memory section for comparing the value of the input signal Im received in the time period with the values of the data signals in the storage locations of the first memory section to store the input signal Im received in the time period in one of the storage locations of the first memory section according to its value among the data signals of the storage locations of the first memory section; and
second comparing means, operative in each time period, responsive to one of said input signals Im−1 received in an immediately preceding time period and the data signals in the storage locations of the second memory section for comparing the value of the input signal Im−1 received in the immediately preceding time period with values of the data signals in the storage locations of the second memory section to store the input signal Im−1 received in the immediately preceding time period in a storage location of the second memory section according to its value among the storage locations of the data signals of the second memory section;
wherein the first input signal is stored so as to replace the predetermined extreme value stored in the last-compared storage location of the second memory section.

11. The apparatus of claim 10 wherein the predetermined extreme value is greater than the largest input signal value.

12. The apparatus of claim 11, wherein:
a data signal Dn in each storage location of said first and second memory sections has a value greater than or equal to a data signal Dn−1 in the next successive storage location; and
said first and second comparing means for comparing a value of an input signal to the values of the data signals in the storage locations of the first and second memory sections comprises:
means responsive to the input signal and the values of the data signals of the storage locations for successively comparing the value of the input signal with the values of the data signals Dn and Dn−1 in each successive pair of storage locations of the respective first and second memory section;
means responsive to the value of the compared next successive data signal Dn−1 being less than equal to the value of the input signal for replacing the compared data signal Dn with the input signal; and
means responsive to the value of the input signal being less than the value of the next successive data signal Dn−1 for replacing the data signal Dn with the next successive data signal Dn−1.

13. The apparatus of claim 12, wherein second comparing means compares the value of the input signal Im−1 with the values of the data signals in the storage locations of said second memory section and stores the input signal Im−1 according to its value among the data signals responsive to the value of the input signal Im−1 being less than the value of all the data signals in all the storage locations of said first and second memory sections.

14. The apparatus of claim 13, wherein the comparing means stores character identifiers with each input signal Im−1.

15. The apparatus of claim 10 wherein the predetermined extreme value is less than the smallest input signal value.

16. The apparatus of claim 15, wherein:

a data signal Dn in each storage location of said first and second memory sections has a value less than or equal to a data signal Dn−1 in the next successive storage location; and said first and second comparing means for comparing a value of the input signal to the values of the data signals of the memory sections comprises:

means responsive to the input signal and the values of the data signals of the storage locations for successively comparing the value of the input signal with the values of data signals Dn and Dn−1 in each successive pair of storage locations of the respective first and second memory section;

means responsive to the value of the compared next successive data signal Dn−1 being greater than the value of the input signal for replacing the compared data signal Dn with the input signal; and means responsive to the value of the input signal being greater than or equal to the value of the next successive data signal Dn−1 replacing the data signal Dn with the next successive data signal Dn−1.

17. The apparatus of claim 16, wherein second comparing means compares the value of the input signal Im−1 with the values of the data signals in the storage locations of said second memory section and stores the input signal Im−1 according to its value among the data signals responsive to the value of the input signal Im−1 being grater than the value of all the data signals in all the storage locations of said first and second memory sections.

18. The apparatus of claim 17, wherein the comparing means stores character identifiers with each input signal Im−1.

19. In an apparatus for recognizing an unknown pattern having means for storing a plurality of reference signals each corresponding to a different prescribed pattern, means for forming a signal representing the unknown pattern, means for generating a sequence of signals Im representing a similarity of the unknown pattern to the reference patterns, and a memory comprising a set of storage locations partitioned into at least first and second memory sections, a method for sorting the similarity signals Im, comprising the automated steps of:

storing a data signal having a predetermined extreme value in each storage location of the at least first and second sections of memory;

sequentially receiving the similarity signals Im including a first similarity signal in successive time periods, each of said similarity signals Im having a value other than the predetermined extreme value; and sorting the successively received similarity signals Im among the storage locations of the at least first and second sections of memory in a prescribed order comprising:

in each time period, a first comparing step of comparing the value of the similarity signal Im received in the time period with the values of the data signals in the storage locations of the first memory section to store the similarity signal Im received in the time period in one of said storage locations according to its value among the data signals of the first memory section storage locations; and in each time period, a second comparing step of comparing the value of a similarity signal Im−1 received in an immediately preceding time period with the values of the data signals in the storage locations of the second memory section to store the similarity signal Im−1 received in the immediately preceding time period in one of said storage locations according to its value among the data signals of the second memory section storage locations;

wherein the first similarity signal is stored so as to replace the predetermined extreme value stored in the last-compared storage location of the second memory section.

20. The method of claim 19 wherein the predetermined extreme value is greater than the largest input signal value.

21. The method of claim 20, wherein:

a data signal Dn in each storage location of the at least first and second memory section has a value greater than or equal to the data signal Dn−1 in the next successive storage location of said at least first and second memory section; and wherein the first and second steps of comparing the value of the similarity signal to the values of the data signals in the storage locations of said at least first and second memory sections comprises the steps of:

successively comparing the value of the similarity signal with the values of the data signals Dn and Dn−1 in each successive pair of storage locations in said at least first and second memory section;

replacing the compared data signal Dn with the similarity signal responsive to the value of the compared next successive data signal Dn−1 being less than or equal to the value of the similarity signal; and replacing the data signal Dn with the next successive data signal Dn−1 responsive to the value of the similarity signal being less than the value of the next successive data signal Dn−1.

22. The method of claim 21, wherein the second comparing step of comparing the value of the similarity signal Im−1 with the values of the data signals in the storage locations of second memory section includes the step of storing the similarity signal Im−1 according to its value among the data signals responsive to the value of the similarity signal Im−1 being less than the value of all the data signals in all the storage locations of said at least first and second memory sections.

23. The method of claim 22, wherein the step of storing includes stores a character identifier with each similarity signal Im−1.

24. The method of claim 19 wherein the predetermined extreme value is less than the smallest similarity signal value.

25. The method of claim 24, wherein:

a data signal Dn in each storage location of said at least first and second memory section has a value less than or equal to a data signal Dn−1 in the next successive memory section location; and wherein the first and second steps of comparing the value of the similarity signal to the values of the data signals in the storage locations of said at least first and second memory section comprises the steps of:

successively comparing the value of the similarity signal with the values of the data signals Dn and Dn−1 in each successive pair of storage locations in said at least first and second memory section;

replacing the compared data signal Dn with the similarity signal responsive to the value of the compared next successive data signal being greater than the value of the similarity signal; and replacing the data signal Dn with the next successive data signal Dn−1 responsive to the value of the similarity signal being greater than or equal to the value of the next successive data signal Dn−1.

26. The method of claim 25, wherein the second comparing step of comparing the value of the similarity signal Im−1 with the values of the data signals in the storage locations of second memory section includes the step of storing the similarity signal Im−1 according to its value among the data signals responsive to the value of the similarity signal Im−1 being greater than the value of all the data signals in all the storage locations of said at least first and second memory sections.

27. The method of claim 26, wherein the step of storing includes storing a character identifier with each similarity signal Im−1.

28. The method of claim 19 wherein the unknown pattern is an image and the reference patterns are reference images.

29. The method of claim 28 wherein the unknown image corresponds to an unknown character and the reference images correspond to reference characters.

30. The method of claim 29, wherein the unknown character and the reference characters are Kanji characters.

31. Apparatus for recognizing an unknown pattern, comprising:

means for storing a plurality of reference signals, each corresponding to a different prescribed reference pattern;

means for forming a signal representing the unknown pattern;

means for generating a sequence of signals Im representing a similarity of the unknown pattern with respect to the reference patterns;

a memory comprising data storage locations partitioned into at least first and second sections;

means for storing a data signal having a predetermined extreme value in each storage locations in the at least first and second memory sections;

means for sequentially receiving the similarity signals Im including a first similarity signal in successive time periods, each similarity signal Im having a value other than the predetermined extreme value; and means responsive to the similarity signals Im received in the successive time periods and the data signals in the storage locations of the at least first and second memory sections for storing the successively received similarity signals Im among the storage locations of the at least first and second memory sections in a prescribed order comprising:

first comparing means, operative in each time period, responsive to the similarly signal Im received in the time period and the data signals in the storage locations of the first memory section for comparing the value of the similarity signal Im received in the time period with the values of the data signals in the storage locations of the first memory section to store the similarity signal Im received in the time period in a storage location of the first memory section according to its value among the data signals of the storage locations of the first memory section; and second comparing means, operative in each time period, responsive to a similarity signal Im−1 received in an immediately preceding time period and the data signals in the storage locations of the second memory section for comparing the value of the similarity signal Im−1 received in the immediately preceding time period with the values of the data signals in the storage locations of the second memory section to store the similarity signal Im−1 received in the immediately preceding time period in a storage location of the second memory section according to its value among the data signals of the storage locations of the second memory section;

wherein the first similarity signal is stored so as to replace the predetermined extreme value stored in the last-compared storage location of the second memory section.

32. The apparatus of claim 31 wherein the predetermined extreme value is greater than the largest similarity signal value.

33. The apparatus of claim 32, wherein:

a data signal Dn in each storage location of the at least first and second memory section has a value greater than or equal to a data signal Dn−1 in the next successive storage location; and said first and second comparing means for comparing the value of the similarity signal to the values of the data signals in storage locations of the at least first and second memory sections comprises:

means responsive to the similarity signal and the values of the data signals of the storage locations for successively comparing the value of the similarity signal with the values of the data signals Dn and Dn−1 in each successive pair of storage locations of the respective first and second memory section;

means responsive to the value of the compared next successive data signal Dn−1 being less than or equal to the value of the similarity signal for replacing the compared data signal Dn with the similarity signal; and means responsive to the value of the compared next successive data signal Dn−1 being greater than the value of the similarity signal for replacing the data signal Dn with the next successive data signal Dn−1.

34. The apparatus of claim 33, wherein second comparing means comprises the value of the similarity signal Im−1 with the values of the data signals in the storage locations of second memory section and stores the similarity signal Im−1 according to its value among the data signals responsive to the value of the similarity signal Im−1 being less than the value of all the data signals in all the storage locations of said at least first and second memory sections.

35. The apparatus of claim 34, wherein the comparing means stores character identifiers with each similarity signal Im−1.

36. The apparatus of claim 32 wherein the signal representing the unknown pattern is a feature signal according to $$F = f1, f2, \ldots, fN,$$

the signal representing the reference pattern is a feature signal according to $$Rm = r1, r2, \ldots, rN,$$

and the means for generating a sequence of signals Im representing the similarity of the unknown pattern to the reference pattern comprises means for forming a signal Im representative of the distance between the signal F and the signal Rm according to $$Im = \sum_{n=1}^{N} |fn - rn|$$

37. The apparatus of claim 32 wherein the signal representing the unknown pattern is a feature signal according to $$F = f1, f2, \ldots, fN,$$

the signal representing the reference pattern is a feature signal according to $$Rm = r1, r2, \ldots, rN,$$

and the means for generating a sequence of signals Im representing the similarity of the unknown pattern to the reference pattern comprises means for forming a signal Im representative of the distance between the signal F and the signal Rm according to $$Im = \sum_{n=1}^{N} (fn - rn)^2$$

38. The apparatus of claim 31 wherein the predetermined extreme value is less than the smallest similarity signal value.

39. The apparatus of claim 38, wherein:
a data signal Dn in each storage location of the at least first and second memory section has a value less than or equal to a data signal Dn−1 in the next successive storage location; and
said first and second comparing means for comparing the value of the similarity signal to the values of the data signals of the at least first and second memory sections comprise:
means responsive to the similarity signal and the values of the data signals of the storage locations for successively comparing the value of the similarity signal with the values of data signals Dn and Dn−1 in each successive pair of storage locations of the respective first and second memory section;
means responsive to the value of a compared next successive data signal Dn−1 being greater than the value of the similarity signal for replacing the compared data signal Dn with the similarity signal; and
means responsive to the value of the compared next successive data signal Dn−1 being less than or equal to the value of the similarity signal for replacing the data signal Dn with the next successive data signal Dn−1.

40. The apparatus of claim 39, wherein second comparing means compares the value of the similarity signal Im−1 with the values of the data signals in the storage locations of second memory section and stores the similarity signal Im−1 according to its value among the data signals responsive to the value of the similarity signal Im−1 being less than the value of all the data signals in all the storage locations of said at least first and second memory sections.

41. The apparatus of claim 40, wherein the comparing means stores character identifiers with each similarity signal Im−1.

42. The apparatus of claim 38 wherein the signal representing the unknown pattern is a feature signal according to $$F = f1, f2, \ldots, fN$$

the signal representing the reference pattern is a feature signal according to $$Rm = r1, r2, \ldots, rN,$$

and the means for generating a sequence of signals Im representing the similarity of the unknown pattern to the reference pattern comprises means for forming a signal Im representative of the distance between the signal F and the signal Rm according to $$Im = \sum_{n=1}^{N} (fn \times rn)^2.$$

43. The method of claim 31 wherein the unknown pattern is an image and the reference patterns are prescribed reference images.

44. The method of claim 43 wherein the unknown image corresponds to an unknown character and the prescribed reference images correspond to prescribed reference characters.

45. The method of claim 44, wherein the unknown character and the reference characters are Kanji characters.

46. A method for sorting a set of input signals Im comprising the automated steps of:
forming at least first and second data sets of data signals, each having a predetermined extreme value;
sequentially receiving the input signals Im including a first input signal in successive time periods, each of said input signals Im having a value other than the predetermined extreme value; and
sorting the successively received input signals Im among the data signals in the at least first and second data sets in a prescribed order comprising:
in each time period, a first comparing step of comparing the value of the input signal Im received in the time period with the values of the data signals in the first data set to store the input signal Im received in the time period in a data position according to its value among the data signals of the first data set; and
in each time period, a second comparing step of comparing the value of an input signal Im−1 received in an immediately preceding time period with the values of the data signals in the second data set to place the input signal Im−1 received in the immediately preceding time period in a data position according to its value among the data signals of the second data set;
wherein the first input signal is stored so as to replace the predetermined extreme value stored in the last-compared storage location of the second data set.

47. The method of claim 46 wherein the predetermined extreme value is greater than the largest input signal value.

48. The method of claim 47, wherein:
a data signal Dn in each said first and second data set has a value greater than or equal to a next successive data signal Dn−1 in the data set; and wherein the first and second steps of comparing the value of the input signal to the values of data signals in the at least first and second data set comprises the steps of:

successively comparing the value of the input signal to the values of each successive pair of data signal Dn and Dn−1 of the at least first and second data set;

replacing the compared data signal Dn with the input signal responsive to the value of the next successive compared data signal Dn−1 being less than or equal to the value of the input signal; and replacing the data signal Dn with the next successive data signal Dn−1 responsive to the value of the next successive data signal Dn−1 being greater than the value of the input signal.

49. The method of claim 48, wherein the second comparing step of comparing the value of the input signal Im−1 with the values of data signals of said first and second data sets include the step of storing the input signal Im−1 according to its value among the data signals responsive to the value of the input signal Im−1 being less than the value of all data signals in said first and second data sets.

50. The method of claim 49, wherein the step of storing includes storing a character identifier with each input signal Im−1.

51. The method of claim 46 wherein the predetermined extreme value is less than the smallest input signal value.

52. The method of claim 51, wherein:

a data signal Dn in each said first and second data set has a value less than or equal to the next successive data signal Dn−1 in the data set; and wherein the first and second step of comparing the value of the input signal to the values of data signals in first and second data set comprises the steps of:

successively comparing the value of the input signal with the values of each successive pair of data signals Dn and Dn−1 of the first and second data set;

replacing the compared data signal Dn with the input signal responsive to the value of the compared next successive data signal Dn−1 being greater than the value of the input signal; and replacing the data signal Dn with the next successive data signal Dn−1 responsive to the value of the next successive data signal Dn−1 being less than or equal to the value of the input signal.

53. The method of claim 52, wherein the second comparing step of comparing the value of the input signal Im−1 with the values of data signals of said first and second data sets include the step of storing the input signal Im−1 according to its value among the data signals responsive to the value of the input signal Im−1 being less than the value of all data signals in said first and second data sets.

54. The method of claim 53, wherein the step of storing includes storing a character identifier with each input signal Im−1.

55. The method for sorting a sequence of input signals including a first input signal having values within a prescribed range in a prescribed order comprising the automated steps of:

forming at least a first data set and a second data set of data signals arranged in positions according to a prescribed order;

setting each of the data signals of the first data set and the second data set to a predetermined extreme value outside the prescribed range;

sorting each of the input signals of the sequence among the data signals of the first and second data sets in the prescribed order comprising:

in each time period, successively comparing the value of one of the input signals of the sequence to the values of data signals in the first data set of the data signals to store the input signal in a position in the first data set according to its value among the data signals of the first data set; and in each time period, successively comparing the value of another of the input signals of the sequence to the values of data signals in the second data set of the data signals to store the another input signal in a position in the data set according to its value among the data signals of the second data set;

wherein the first input signal is stored so as to replace the predetermined extreme value stored in the last compared storage location of the second data set.

* * * * *

UNITED STATES PATENT AND TRADEMARK OFFICE
CERTIFICATE OF CORRECTION

PATENT NO. : 5,303,381
DATED : April 12, 1994
INVENTOR(S) : Toshiaki Yagasaki

It is certified that error appears in the above-identified patent and that said Letters Patent is hereby corrected as shown below:

<u>COLUMN 7</u>

Line 19, "$DN-1 \geq DN$" should read $DN-1 \leq DN$--.

<u>COLUMN 8</u>

Line 42, "DN/2:" should read --DN/2,--.

<u>COLUMN 16</u>

Line 35, "value" should read --values--.

<u>COLUMN 18</u>

Line 44, "section;" should read --sections;--.

<u>COLUMN 19</u>

Line 13, "section;" should read --sections--;
       Line 20, "replacing" should read --for replacing--; and
       Line 29, "grater" should read --greater--;

<u>COLUMN 20</u>

Line 16, "section" should read --sections--;
       Line 19, "section;" should read --sections--;

UNITED STATES PATENT AND TRADEMARK OFFICE
CERTIFICATE OF CORRECTION

PATENT NO. : 5,303,381

DATED : April 12, 1994

INVENTOR(S) : Toshiaki Yagasaki

It is certified that error appears in the above-identified patent and that said Letters Patent is hereby corrected as shown below:

COLUMN 20 (Cont.)

Line 28, "section;" should read --sections--;
    Line 41, "second" should read --said second--;
    Line 48, "stores" should read --storing--;
    Line 55, "section" should read --sections--;
    Line 61, "section" should read --sections--; and
    Line 66, "section;" should read --sections--.

COLUMN 21

Line 10, "second" should read --said second--; and
    Line 41, "locations" should read --location--.

COLUMN 22

Line 21, "section" should read --sections;
    Line 33, "section;" should read --sections--; and
    Line 47, "second" should read --said second--.

COLUMN 23

Line 46, "section;" should read --sections--; and
    Line 59, "second " should read --said second--.

UNITED STATES PATENT AND TRADEMARK OFFICE
CERTIFICATE OF CORRECTION

PATENT NO. : 5,303,381
DATED : April 12, 1994
INVENTOR(S) : Toshiaki Yagasaki

PAGE 3 OF 3

It is certified that error appears in the above-identified patent and that said Letters Patent is hereby corrected as shown below:

<u>COLUMN 24</u>

Line 60, "set" should read --sets--.

<u>COLUMN 25</u>

Line 3, "set" should read --sets--;
    Line 6, "signal" should read --signals--;
    Line 8, "set;" should read --sets;--;
    Line 21, "include" should read --includes--;
    Line 33, "set" should read --sets--;
    Line 36, "step" should read --steps--;
    Line 38, "set" should read --sets--; and
    Line 44, "sets;" should read --sets--.

Signed and Sealed this

Tenth Day of January, 1995

*Attest:*

BRUCE LEHMAN

*Attesting Officer*      *Commissioner of Patents and Trademarks*